United States Patent
Hattori

(10) Patent No.: US 9,858,769 B2
(45) Date of Patent: Jan. 2, 2018

(54) SELF-CHECKOUT APPARATUS AND SELF-CHECKOUT METHOD

(71) Applicant: TOSHIBA TEC KABUSHIKI KAISHA, Shinagawa-ku, Tokyo (JP)

(72) Inventor: Daisuke Hattori, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/689,141

(22) Filed: Apr. 17, 2015

(65) Prior Publication Data
US 2015/0302708 A1 Oct. 22, 2015

(30) Foreign Application Priority Data
Apr. 18, 2014 (JP) ................................. 2014-086807

(51) Int. Cl.
G06Q 20/00 (2012.01)
G07G 1/00 (2006.01)
G06K 7/10 (2006.01)
G06Q 20/18 (2012.01)

(52) U.S. Cl.
CPC ......... *G07G 1/009* (2013.01); *G06K 7/10009* (2013.01); *G06K 7/10336* (2013.01); *G06K 7/10356* (2013.01); *G06Q 20/18* (2013.01); *G07G 1/0018* (2013.01)

(58) Field of Classification Search
CPC ................................. G06Q 30/06; G06K 7/00
USPC .................................. 235/382, 383; 705/16
See application file for complete search history.

(56) References Cited

U.S. PATENT DOCUMENTS

| 6,236,736 | B1 * | 5/2001 | Crabtree | G01S 3/7865 235/383 |
| 2002/0170961 | A1 * | 11/2002 | Dickson | G06K 7/0008 235/383 |
| 2007/0046473 | A1 | 3/2007 | Kato | |

(Continued)

FOREIGN PATENT DOCUMENTS

| JP | 2004-260576 | 9/2004 |
| JP | 2006-127219 | 5/2006 |

(Continued)

OTHER PUBLICATIONS

Japanese Office Action for Japanese Patent Application No. 2014-086807 dated May 23, 2017.

(Continued)

*Primary Examiner* — Rokib Masud
(74) *Attorney, Agent, or Firm* — Amin, Turocy & Watson LLP

(57) ABSTRACT

In accordance with one embodiment, a self-checkout apparatus comprises a reading module configured to read information of a wireless tag from a commodity attached with the wireless tag and housed in a storage room, and a data processing module configured to carry out sales registration and checkout processing of the commodity of which the wireless tag information is read by the reading module; wherein the reading module includes, inside the storage room, an antenna section for reading the information of the wireless tag from the commodity housed in the storage room, and a moving section for changing communication range of the antenna section with the wireless tag.

11 Claims, 15 Drawing Sheets

(56) References Cited

U.S. PATENT DOCUMENTS

| | | | |
|---|---|---|---|
| 2008/0036607 A1* | 2/2008 | Suzuki | G06K 7/0008 340/572.7 |
| 2008/0224826 A1* | 9/2008 | Kuwako | G06K 7/0008 340/10.1 |
| 2009/0102610 A1* | 4/2009 | Lance | G06K 7/0008 340/10.2 |
| 2011/0075213 A1* | 3/2011 | Murayama | G03G 21/1882 358/1.15 |
| 2011/0102149 A1* | 5/2011 | Lin | G06F 3/012 340/10.1 |
| 2012/0062381 A1* | 3/2012 | Liu | G01S 11/06 340/572.1 |
| 2013/0284806 A1* | 10/2013 | Margalit | G01G 19/414 235/382 |
| 2014/0027511 A1 | 1/2014 | Plocher et al. | |

FOREIGN PATENT DOCUMENTS

| | | |
|---|---|---|
| JP | 2006-260036 | 9/2006 |
| JP | 2007-065991 | 3/2007 |
| JP | 2007-264918 | 10/2007 |
| JP | 2009-289297 | 12/2009 |
| WO | WO 2013028380 | * 2/2013 |

OTHER PUBLICATIONS

Japanese Office Action for Japanese Patent Application No. 2014-086807 dated Oct. 31, 2017.

* cited by examiner

FIG.2
(a)
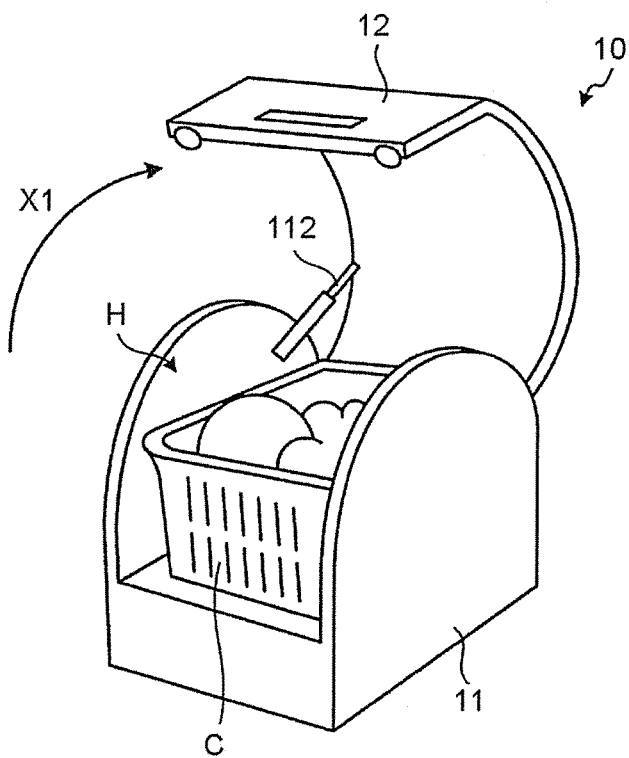
(b)
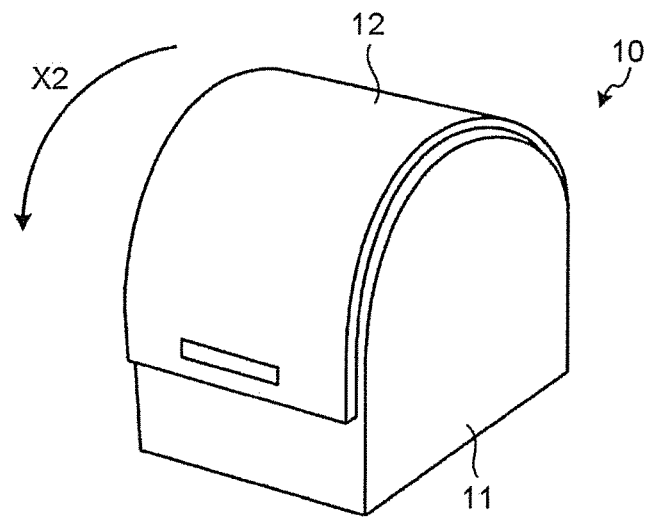

SELF-CHECKOUT APPARATUS AND SELF-CHECKOUT METHOD

CROSS-REFERENCE TO RELATED APPLICATION

This application is based upon and claims the benefit of priority from Japanese Patent Application No. 2014-086807, filed Apr. 18, 2014, the entire contents of which are incorporated herein by reference.

FIELD

Embodiments described herein relate generally to a self-checkout apparatus and a self-checkout method.

BACKGROUND

Conventionally, there exists a commodity sales processing apparatus which reads commodity information from an RFID tag attached to each commodity and carries out sales registration and checkout processing based on the read commodity information. For example, there is proposed an apparatus that collectively reads the commodity information when the commodities or a shopping basket which houses the commodities are placed on a checkout counter in which a plate antenna is arranged.

In recent years, more and more stores adopt a sales form that includes a self-checkout apparatus (such as self-checkout POS (Point Of Sales) terminal and self-register device) for a customer to carry out sales registration and checkout processing of the purchased commodity by himself, and the customer uses the sales form to carryout the sales registration and the checkout processing of the commodity. Generally, the customer scans, with a scanner arranged in such a self-checkout apparatus, a code symbol attached to the commodity to carry out the commodity sales registration.

However, in the constitution of the self-checkout apparatus described above, the customer needs to scan a code symbol attached to the commodity little by little with the scanner. As a result, the customer has to locate the code symbol of each commodity and match the reading direction of the scanner and the code symbol every time, which is a big burden for the inexperienced customers. Besides, the burden of the customer is increased as the number of the commodities to be sales-registered is increased.

As a result, much time is taken for the sales registration and the checkout processing in the self-checkout apparatus and the processing efficiency of the self-checkout apparatus is reduced, thus, it is desired to improve the processing efficiency.

BRIEF DESCRIPTION OF THE DRAWINGS

FIG. 2 is an external perspective view illustrating the schematic constitution of a reading apparatus;

DETAILED DESCRIPTION

In accordance with one embodiment, a self-checkout apparatus comprises a reading module configured to read information of a wireless tag from a commodity attached with the wireless tag and housed in a storage room, and a data processing module configured to carry out sales registration and checkout processing of the commodity of which the wireless tag information is read by the reading module; wherein the reading module includes, inside the storage room, an antenna section for reading the information of the wireless tag from the commodity housed in the storage room, and a moving section for changing communication range of the antenna section with the wireless tag.

Figure 1:
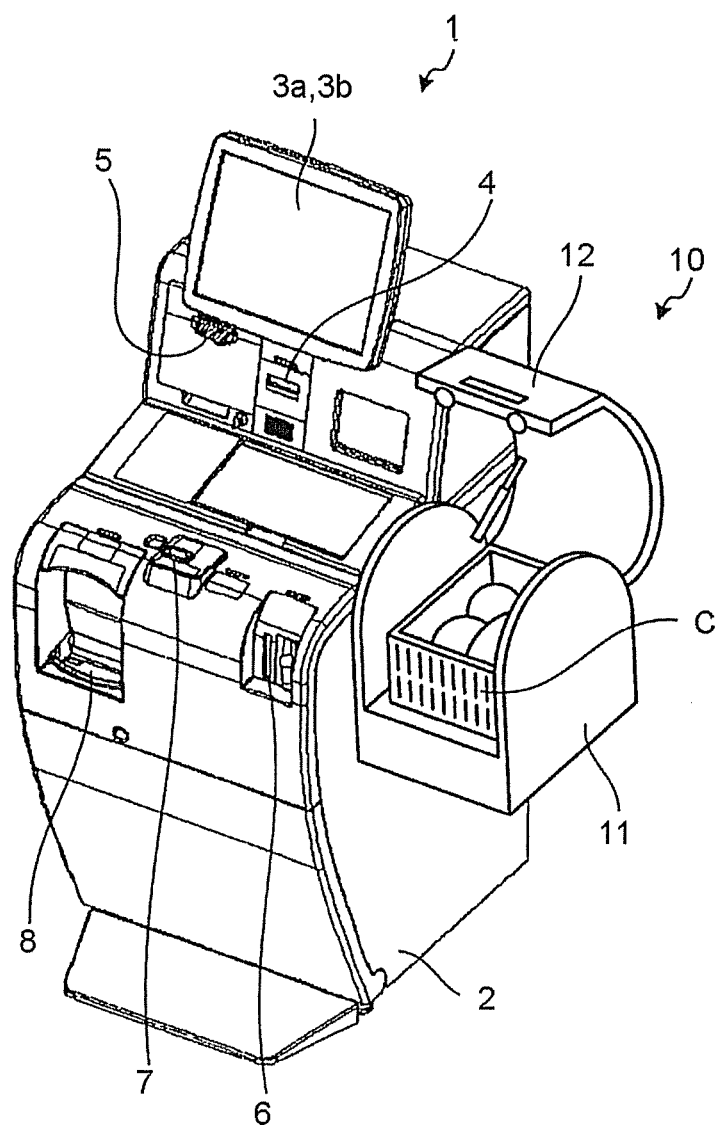
FIG. 1 is an external perspective view illustrating the constitution of a self-checkout apparatus according to one embodiment.

FIG. 1 is an external perspective view illustrating the constitution of a self-checkout apparatus 1 according to the present embodiment. The self-checkout apparatus 1 is used in, for example, a super market or a store such as a clothing store and the like. A main body 2 (data processing module) of the self-checkout apparatus 1 is equipped with a display 3b on the surface of which a touch panel 3a is arranged. The display 3b may be, for example, a liquid crystal display device.

A card inserting port 4 for inserting a point card or a credit card of the customer during the settlement processing and a receipt issuing port 5 for issuing a receipt are arranged in the main body 2 of the self-checkout apparatus 1. The main body 2 is further equipped with a bill depositing and dispensing port 6 for depositing bills and dispensing change during the settlement processing, a coin depositing port 7 for depositing coins during the settlement processing, and a coin dispensing port 8 for dispensing change coins.

A reading apparatus 10 (reading module) which reads a wireless tag (an RFID (Radio Frequency Identifier) tag in the present example, particularly, an RFID tag operating in UHF band) attached to the commodity is arranged at the right side of the main body 2. The reading apparatus 10, which is described in detail later, functions as a storage room which houses the commodities and shields electric wave from the outside of the reading apparatus 10.

The reading apparatus 10 is connected with the self-checkout apparatus 1 through a cable (not shown) and the like, and outputs (sends) various kinds of information read from the RFID tag attached to the commodity to the self-checkout apparatus 1. The reading apparatus 10 is constituted integrally with the self-checkout apparatus 1.

Herein, it is assumed that the RFID tag (not shown) in which a commodity code for identifying the commodity is recorded is attached to each commodity; and a storage area for writing a later-described registration completion flag is prepared in the RFID tag. The registration completion flag is written to prevent the commodity from being taken out of the store by mistake without being settled. The existence of the registration completion flag is checked by a gate arranged at the exit/entrance of the store, and a warning is given by a notification module such as a buzzer if the registration completion flag is not written.

Hereinafter, the reading apparatus 10 is described.

FIG. 2 is an external perspective view illustrating the schematic constitution of the reading apparatus 10. FIG. 2 (a) shows an opened state in which an opening and closing lid 12 of the reading apparatus 10 is opened; FIG. 2 (b) shows a closed state in which the opening and closing lid 12 of the reading apparatus 10 is closed.

Figure 3:
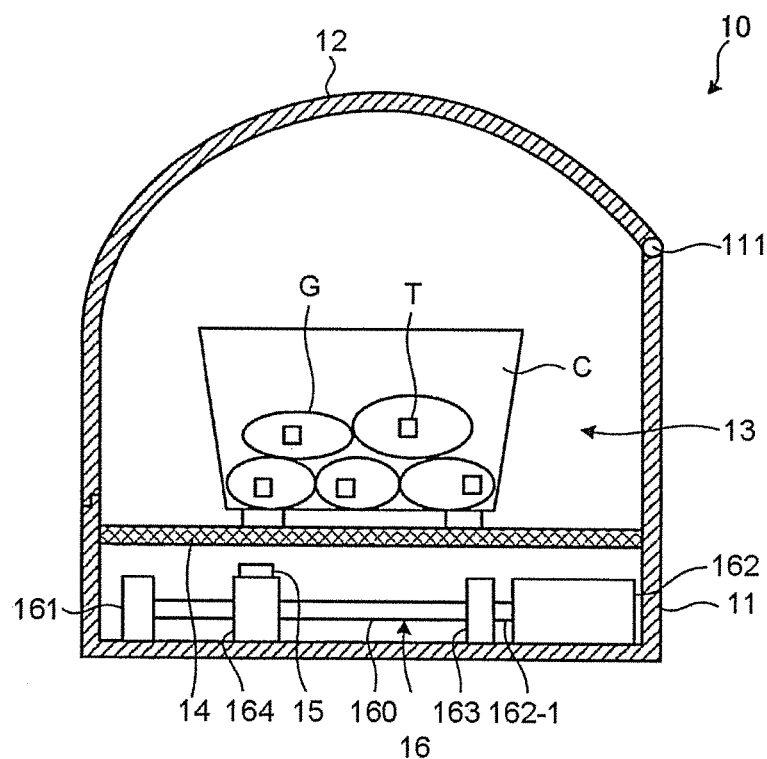
FIG. 3 is a schematic cross-sectional view of the reading apparatus.

FIG. 3 is a schematic cross-sectional view illustrating the reading apparatus 10 of which the opening and closing lid 12 is in the closed state.

The reading apparatus 10 is equipped with a housing 11 constituting the main exterior of the reading apparatus 10, and the opening and closing lid 12 for opening and closing an opening H which is arranged in the housing 11 and serves as the exit/entrance of a shopping basket C. The housing 11, a substantial box, is formed into such a proportion that the depth is longer than the width, that is, the housing 11 is longer in the depth direction. Further, the housing 11 includes a reading room (storage room) 13 that is large enough to house the shopping basket C inside.

The outer wall (outer surface) of the housing 11 and the opening and closing lid 12 is made with an electric wave absorbing member that absorbs electric waves or an electric wave reflecting member such as a metal plate, a mold material and the like. No specific limitation is given to the inner wall (inner surface) of the housing 11 and the opening and closing lid 12, and the inner wall (inner surface) of the housing 11 and the opening and closing lid 12 may be covered with the electric wave reflecting member or the electric wave absorbing member.

The opening and closing lid 12 can be turned into the opened state (FIG. 2 (a)) if pulled upwards in a direction indicated by an arrow X1 around a hinge mechanism 111 arranged at the back side of the housing 11. On the contrary, the opening and closing lid 12 can be turned into the closed state (FIG. 2 (b)) if pulled downwards in a direction indicated by an arrow X2 around the hinge mechanism 111. The customer can turn the opening and closing lid 12 into the opened state to put or take out the shopping basket C in which the commodity is housed in or from the reading room 13 of the housing 11 through the opening H of the housing 11. Further, a damper 112 (refer to FIG. 2 (a)) may be arranged between the housing 11 and the opening and closing lid 12 to slow down the opening/closing speed of the opening and closing lid 12 and to keep the opening and closing lid 12 in the opened state.

In the reading room 13, the shopping basket C is placed on a placing table 14. The placing table 14 which is an insulative (electric wave permeable) plate-shaped member such as wood or glass is supported in the housing 11 with a certain gap from the housing 11.

An RFID antenna 15 is arranged in the reading room 13 as an RFID antenna section used to read and write the information of the RFID tag. An antenna device which is equipped with a planar patch antenna in the rectangular housing and is also used in data transmission may be used as the RFID antenna 15. The RFID antenna 15 is connected, through a port for antenna, with a reader/writer device (not shown) including a reader/writer through a coaxial cable. The arrangement position of the reader/writer device is preferred to be a position where the reading and writing of the information of the RFID tag is not interfered. Specifically, the reader/writer device may be arranged around the housing 11 outside the reading room 13 or in the self-checkout apparatus. If it is to be arranged inside the reading room 13, it may be arranged at empty space such as the gap between the placing table 14 and the bottom of the housing 11. In this case, it is more preferable to cover the reader/writer device with a protecting member such as the electric wave absorbing member to eliminate or reduce the influence of the electric wave brought to the reader/writer device or the influence of the electric wave environment from the reader/writer device to the external.

In the present embodiment, the RFID antenna 15 is arranged on a moving mechanism 16 (refer to FIG. 3) arranged below the placing table 14 to be capable of moving in the reading room 13.

Figure 4:
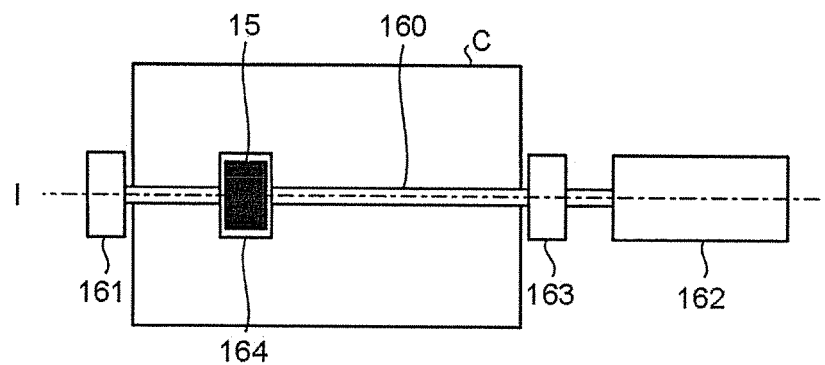
FIG. 4 is a plan view illustrating a moving mechanism.

FIG. 4 is a plan view illustrating the moving mechanism 16 shown in FIG. 3. The outer shape of the shopping basket C is schematically shown in FIG. 4 so that the arrangement of the RFID antenna 15 and the shopping basket C can be seen clearly. Further, the components corresponding to the moving mechanism 16 shown in FIG. 3 are indicated by the same reference numerals in FIG. 4.

The moving mechanism 16 is mainly constituted by a linear moving mechanism including a threaded shaft 160, a bearing 161 of the threaded shaft 160, a stepping motor 162 serving as a rotation power source, a coupling 163 for transmitting rotation power to the threaded shaft 160, and a moving stage (first moving section) 164 constituted integrally with a ball screw nut which is screwed onto the threaded shaft 160.

The threaded shaft 160 is horizontally supported by the bearing 161 at one end and the coupling 163 at the other end to be capable of rotating freely. An output shaft 162-1 of the stepping motor 162 is connected with the other end of the threaded shaft 160 in the coupling 163. With such a constitution, the rotation power of the stepping motor 162 is transmitted from the output shaft 162-1 to the threaded shaft 160 via the coupling 163.

The moving stage 164 has a through-hole in the main body thereof, and the ball screw nut of the threaded shaft 160 is buried in the through-hole. The moving stage 164 screws the ball screw nut onto the threaded shaft 160 to move forward and backward along the threaded shaft 160 through the rotation of the threaded shaft 160. The moving stage 164 can move smoothly as metal balls (steel balls) are arranged in the threaded portion of the threaded shaft 160 and the ball screw nut during the moving.

In this way, with the ball screw mechanism stated above, the rotation motion of the stepping motor 162 can be changed into linear motion, and the moving stage 164 can move front and back.

The moving stage 164 contacts one part of the main body thereof with a linear guide (not shown) while sliding along the threaded shaft 160 so that the main body thereof does not rotate through the rotation of the threaded shaft 160. In this way, the moving stage 164 moves linearly with respect to the threaded shaft 160 while keeping the posture thereof constant.

The RFID antenna 15 is fixed on the main body of the moving stage 164 with the reading surface thereof directed upwards. The reading surface refers to an emitting surface of the planar patch antenna for emitting electric wave. In this way, the RFID antenna 15 emits electric wave of high strength towards the front of the reading surface, that is, the upward direction in FIG. 4.

The reader/writer device (not shown) is connected with the moving RFID antenna 15 through a bendable coaxial cable.

Though it is not specifically described in the present embodiment, in order to improve the positioning accuracy of the moving stage 164, a sensor may be arranged on the moving path of the moving stage 164 to carry out position correction and the like. For example, a sensor (such as a micro switch or proximity sensor) may be arranged at the moving start position and the moving end position of the moving stage 164 to carry out positioning more reliably, such as stopping the moving of the moving stage 164 if the moving stage 164 is detected by the sensor, or correcting the movement amount.

According to the constitution described above, if the stepping motor 162 is rotated in a pre-determined direction, the moving stage 164 moves towards the right side of FIG. 4 along the threaded shaft 160, and if the stepping motor 162 is rotated reversely, the moving stage 164 moves back towards the left side of FIG. 4 along the threaded shaft 160. Through the motion of the moving stage 164, the RFID antenna 15 is moved integrally with the moving stage 164 with the reading surface thereof directed upwards. Through the motion of the moving stage 164, the RFID antenna 15 communicates with the RFID tag while changing the communication range with the RFID tag. Hereinafter, for the sake of convenience of description, the rotation direction of the stepping motor 162 which makes the moving stage 164 move towards the right side of FIG. 4 along the threaded shaft 160 is referred to as forward rotation; otherwise, the rotation direction of the stepping motor 162 is referred to as reverse rotation.

The RFID antenna 15 emits electric waves at UHF band and the like to carry out communication with the RFID tags existing in the reading room 13, that is, the RFID tag T of each commodity G housed in the shopping basket C (refer to FIG. 3).

The moving mechanism 16 of the present embodiment is so arranged that the RFID antenna 15 is moved forward and backward along the longitudinal direction of the shopping basket C. As shown in FIG. 4, the RFID antenna 15 is arranged to move forward and backward in or nearby a vertical plane containing a center line 1 (a line that bisects two lines in the lateral direction of the shopping basket C) of the shopping basket C. The RFID antenna 15 is arranged to move forward and backward from one end to the other end of the shopping basket C in the longitudinal direction of the shopping basket C.

According to the constitution, the RFID antenna 15 can read the RFID tag T attached to the commodity in the shopping basket C from any point on the center line of the shopping basket C.

That is, it is possible that the RFID tags T of the commodities at the left end of the shopping basket C in FIG. 4 are read when the RFID antenna 15 is located at the left end, and the RFID tags T of the commodities at the right end of the shopping basket C in FIG. 4 are read when the RFID antenna 15 is located at the right end.

Further, the angle with the antenna surface of the RFID tag T can be changed through the motion of the RFID antenna 15, thus, even the RFID tag T located at a position where it can hardly be read can be read easily, which prevents the reading omission of the information of the RFID tag T located at a position where it can hardly be read.

According to the reading apparatus 10 with such a constitution, the commodity (RFID tag T) in the shopping basket C can be collectively read by the RFID antenna 15 by putting the shopping basket C in the reading room 13, as shown in the drawings. Further, the outer surface of the reading apparatus 10 (the housing 11 and the opening and closing lid 12) is covered with the electric wave reflecting member, thus, the environment in the reading room 13 is protected from the external electric wave (noise), which can prevent the occurrence of incorrect operations.

Next, the hardware constitution of the self-checkout apparatus 1 and the reading apparatus 10 is described.

Figure 5:
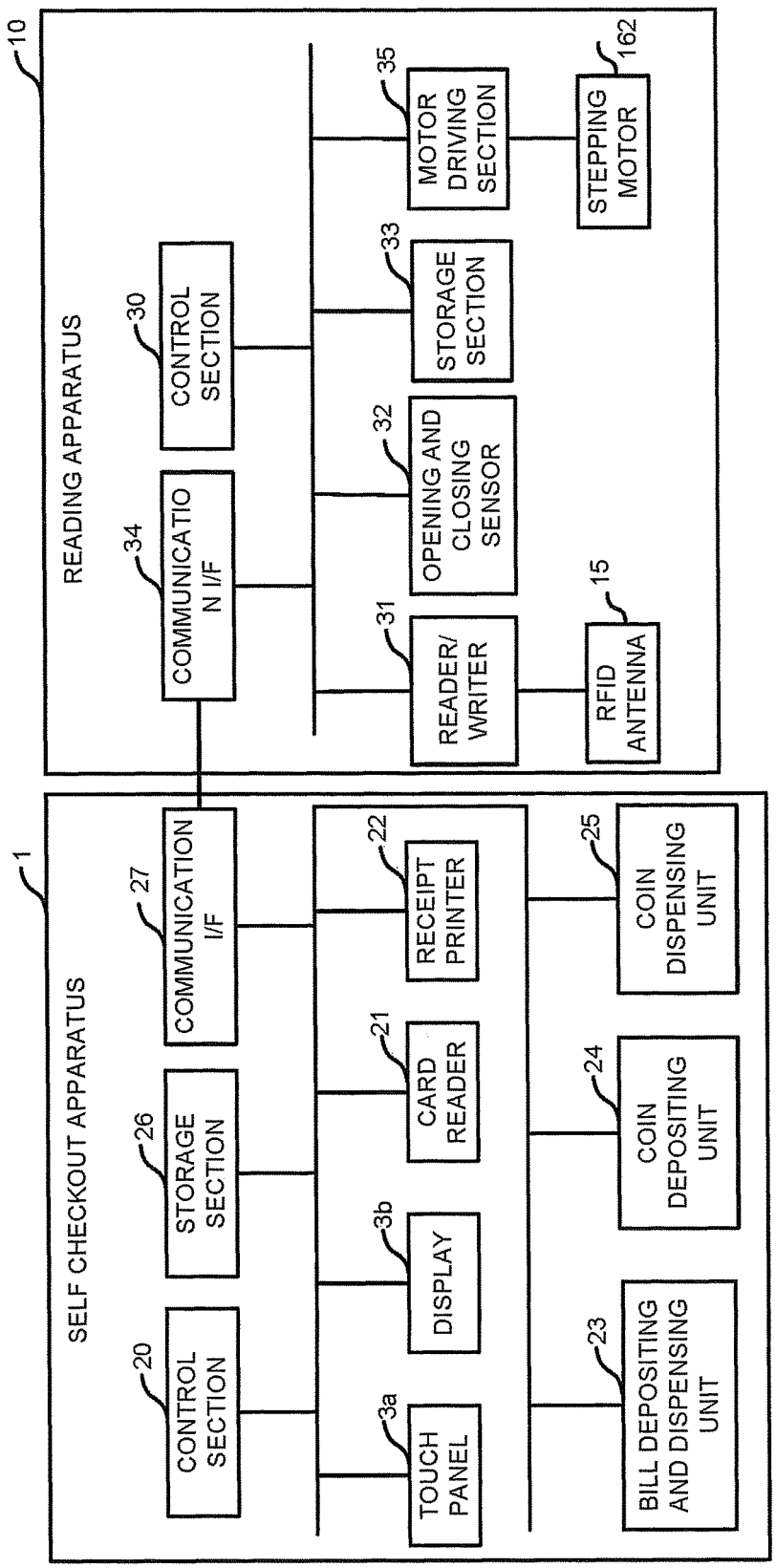
FIG. 5 is a block diagram illustrating the hardware constitution of the self-checkout apparatus and the reading apparatus.

FIG. 5 is a block diagram illustrating the hardware constitution of the self-checkout apparatus 1 and the reading apparatus 10.

The self-checkout apparatus 1 is equipped with a control section 20 serving as a computer including a CPU (Central Processing Unit), an ROM (Read Only Memory) and an RAM (Random Access Memory). The ROM stores various data and various programs executed by the CPU. The RAM temporarily stores data and programs when the CPU executes various programs.

The control section 20 is connected with the touch panel 3a, the display 3b, a card reader 21, a receipt printer 22, a bill depositing and dispensing unit 23, a coin depositing unit 24 and a coin dispensing unit 25 through various input/output circuits (not shown).

The card reader 21 reads the information of a point card or a credit card of the customer inserted from the card inserting port 4. The receipt printer 22 prints a receipt after the checkout processing and issues it from the receipt issuing port 5. The bill depositing and dispensing unit 23 processes the bills deposited or dispensed from the bill depositing and dispensing port 6. The coin depositing unit 24 processes the coins deposited from the coin depositing port 7 and the coin dispensing unit 25 processes the coins dispensed from the coin dispensing port 8.

The control section 20 is further connected with a storage section 26 and a communication I/F 27 through various input/output circuits (not shown).

The storage section 26 includes a nonvolatile storage medium such as an SSD (Solid State Drive), or an HDD (hard Disk Drive). The storage section 26 stores various programs and various data relating to the operation of the self-checkout apparatus 1. As to the data stored in the storage section 26, for example, a commodity master file in which the commodity information relating to each commodity is registered in association with the commodity code for identifying the commodity is listed. The commodity information includes, for example, a commodity name, a price and the like of the corresponding commodity. The communication I/F 27 carries out the transmission of various data with the reading apparatus 10.

On the other hand, the reading apparatus 10 is equipped with a control section 30 serving as a computer including a CPU, an ROM and an RAM. The ROM stores various data and various programs executed by the CPU. The RAM temporarily stores data and programs when the CPU executes various programs.

The control section 30 is connected with a reader/writer 31, an opening and closing sensor 32, a storage section 33, a communication I/F 34, a motor driving section 35 and the like through various input/output circuits (not shown).

The reader/writer 31 communicates with the RFID tag T through the RFID antenna 15 under the instruction from the control section 30 to carry out data transmission.

The communication with the RFID tag T is divided into two cycles.

For example, in a case in which the RFID tag T is not equipped with a battery of passive system, the communication is carried out as follows.

Reading cycle: amplifying non-modulated carrier wave and emitting as the electric wave (interrogation wave) from the RFID antenna 15, receiving, with the RFID antenna 15, the RFID tag T information such as an identification code carried on the reflected wave (response wave) in the RFID tags T within a response range of the emitted electric wave, demodulating the tag information from the carrier wave, and sending the demodulated tag information to the control section 30.

Writing cycle: modulating the carrier wave according to a writing signal from the control section 30, amplifying modulated carrier wave and emitting as the electric wave from the RFID antenna 15, writing information in the RFID tag T within the response range of the emitted electric wave, receiving the result and notifying to the control section 30. The RFID tag T within the response range of the electric wave emitted from the RFID antenna 15 receives the electric wave from the RFID antenna 15 with the antenna thereof and activates the communication chip, and carries the tag information stored in a memory on the reflected wave. Further, the information is written in a writing area in the memory based on a writing command.

The motor driving section 35, which is a drive circuit for operating the stepping motor 162, outputs a pulse signal for rotating the stepping motor 162 by a pre-determined angle (step angle) to the stepping motor 162 under the control of the control section 30.

The opening and closing sensor 32 detects the opened/closed state of the opening and closing lid 12. The opening and closing sensor 32 outputs opened/closed state information indicating the opened/closed state of the opening and closing lid 12 to the control section 30. The opening and closing sensor 32 may be realized through a micro-switch or a magnetic sensor arranged at, for example, the hinge mechanism of the opening and closing lid 12 or the position where the housing 11 is contacted with the opening and closing lid 12. In a case in which the reading room 13 becomes dark in the closed state of the opening and closing lid 12, the opening and closing sensor 32 may be realized through a light sensor arranged in the reading room 13.

The storage section 33 includes a nonvolatile storage medium such as an SSD, or an HDD. The storage section 33 stores various programs and various data relating to the operation of the reading apparatus 10.

The communication I/F 34 carries out the transmission of various data with the self-checkout apparatus 1.

Next, the functional components of the self-checkout apparatus 1 and the reading apparatus 10 are described.

Figure 6:
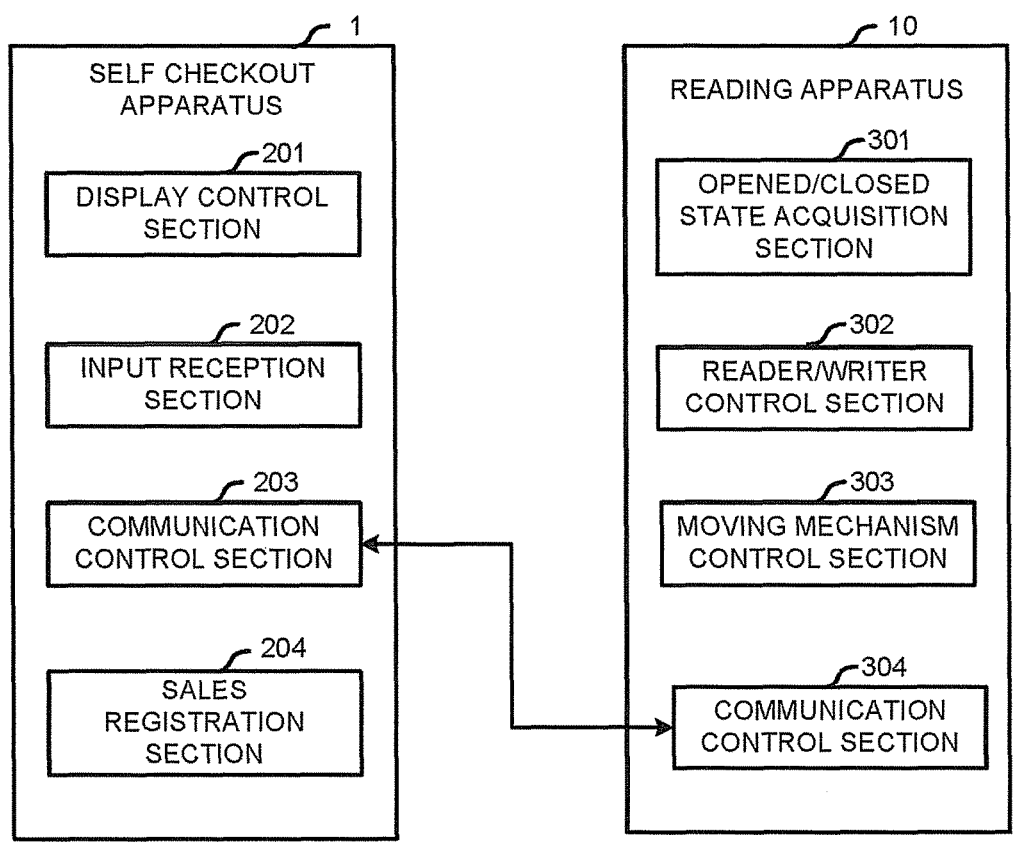
FIG. 6 is a block diagram illustrating the functional components of the self-checkout apparatus and the reading apparatus.

FIG. 6 is a block diagram illustrating the functional components of the self-checkout apparatus 1 and the reading apparatus 10.

The control section 20 (CPU) of the self-checkout apparatus 1 cooperates with the programs stored in the storage section 26 to realize the functions of a display control section 201, an input reception section 202, a communication control section 203 and a sales registration section 204.

The display control section 201 controls the display 3b to display various screens on the display 3b. For example, the display control section 201 controls to display a screen including an operator (hereinafter referred to as a "reading start button") for instructing the reading start of the commodity code (RFID tag T) and an operator (hereinafter referred to as a "reading termination button") for instructing the reading termination. The display control section 201 further controls to read the commodity information corresponding to the commodity code sent from the reading apparatus 10 from the commodity master file and then display deposit amount, change amount, and the commodity name and price of the commodity contained in the commodity information.

The input reception section 202 receives an input operation carried out through the touch panel 3a. For example, in a case in which an operator on the operation screen displayed on the display 3b is operated (touched), the input reception section 202 outputs the instruction information corresponding to the operator to the control section 20.

The communication control section 203 controls the communication I/F 27 to transmit various kinds of information between the self-checkout apparatus 1 and the reading apparatus 10. For example, if the reading start button is operated, the communication control section 203 sends the instruction information instructing the reading start to the reading apparatus 10. The communication control section 203 further receives the commodity code sent from the reading apparatus 10. If the reading termination button is operated, the communication control section 203 sends the instruction information instructing the reading termination to the reading apparatus 10. If the sales registration is completed by the sales registration section 204, the communication control section 203 sends the instruction information instructing the registration completion to the reading apparatus 10.

The sales registration section 204, after confirming the payment through the settlement processing for each commodity corresponding to the commodity codes sent from the reading apparatus 10, sales-registers these commodity codes as the commodities the customer purchased. Specifically, the sales registration section 204 registers the commodity code of each commodity together with the deposit amount, the change amount and the transaction date into the database for registration. The database for registration may be provided in the storage section 26 of the self-checkout apparatus 1 or an external device that is capable of communicating with the self-checkout apparatus 1.

On the other hand, the control section 30 (CPU) of the reading apparatus 10 cooperates with the programs stored in the storage section 33 to realize the functions of an opened/closed state acquisition section 301, a reader/writer control section 302, a moving mechanism control section 303 and a communication control section 304.

The opened/closed state acquisition section 301 cooperates with the opening and closing sensor 32 to acquire the opened/closed state information indicating whether the opening and closing lid 12 is in the opened state or the closed state.

The reader/writer control section 302 controls the reader/writer 31 to read the RFID tag T attached to the commodity and write information in the RFID tag T.

Specifically, if the reading-start instruction is sent from the self-checkout apparatus 1 and the opened/closed state information acquired by the opened/closed state acquisition section 301 indicates that the opening and closing lid 12 is in the closed state, the reader/writer control section 302 controls to start the reading (reading cycle) first. The tag information (commodity code in the example) read from the RFID tag T is sent from the reader/writer control section 302 to the self-checkout apparatus 1 at any time.

On the other hand, if the reading-termination instruction is received from the self-checkout apparatus 1, the reader/writer control section 302 controls the reader/writer 31 to terminate the reading processing. Further, if a registration completion instruction is sent from the self-checkout apparatus 1, the reader/writer control section 302 controls the reader/writer 31 to start the writing (writing cycle) of the registration completion flag. Herein, the registration completion flag indicates that the sales registration is completed and is written in a pre-determined storage area of the RFID tag T.

If the opening and closing lid 12 is turned into the opened state during a period from the moment the reading of the RFID tag T is started to the moment the registration completion flag is written, the reader/writer control section 302 terminates the reading and executes a reset processing to reset the commodity codes that have been read until now. Through such a reset processing, the commodity codes sent to the self-checkout apparatus 1 are also reset. The reader/writer control section 302, if confirming that the opening and closing lid 12 is turned into the closed state again, re-executes the reading processing of the RFID tag T.

In this way, even if a new commodity of which the RFID tag T is not read yet is put in the shopping basket (reading room 13) before the settlement processing is completed, the reading of the commodity can be carried out more reliably. In addition, it is applicable to notify the self-checkout apparatus 1 that the opening and closing lid 12 is turned into the opened state, and display a screen on the display 3b of the self-checkout apparatus 1 to notify the user that the opening and closing lid 12 is in the opened state.

The moving mechanism control section 303 controls the motor driving section 35 during the processing of reading the RFID tag T.

Specifically, the moving mechanism control section 303 drives the motor driving section 35 during the execution of the reading cycle (or the writing cycle) of the RFID tag T by the reader/writer control section 302 so that the moving stage 164 operates in the following operation patterns.

For example, the operation patterns of the moving stage 164 include the following.

Pattern 1: driving, if the reader/writer control section 302 starts the control of the reading cycle (or the writing cycle), the motor driving section 35 to move the moving stage 164 in the forward direction at a constant velocity; reversely moving, if the moving stage 164 is moved to the end or a position nearby the end of the threaded shaft 160, the moving stage 164 in a reverse direction at a constant velocity to move the moving stage 164 to the other end or a position nearby the other end of the threaded shaft 160; reversely moving the moving stage 164 in the forward direction at a constant velocity if the moving stage 164 is moved to the other end or a position nearby the other end of the threaded shaft 160, and repeating the procedure until the end; stopping the driving of the motor driving section 35 if the reader/writer control section 302 terminates the control of the reading cycle (or the writing cycle), and stopping the moving stage 164 where it is.

Further, the moving speed of the moving stage 164 is maintained at a speed slower than a speed at which the RFID antenna 15 can communicate with the RFID tag T.

Pattern 2: intermittently driving the motor driving section 35 from the start to the end of the control of the reading cycle (or the writing cycle) to move the moving stage 164 for a pre-determined distance and stop the moving stage 164 repeatedly. In this case, it is preferred to set the moving speed of the moving stage 164 to a high speed, and set the stopping time of the moving stage 164 to such a certain time that the communication between the RFID antenna 15 and the RFID tag T is completed.

Further, in a case in which the moving stage 164 is generally started from a pre-determined start position (for example, one end of the threaded shaft 160), it is controlled to drive the motor driving section 35 to return the moving stage 164 to an initial position (reading start position or writing start position) after the control of the reading cycle (or the writing cycle) is terminated by the reader/writer control section 302. In this case, the motor driving section 35 is controlled by the same control amount (number of pulses) from the motion start to the motion end, and in this way, the stepping motor 162 is rotated in a forward direction or a reverse direction to return the moving stage 164 to the initial position.

In a case in which a sensor for positioning is arranged, the motor driving section 35 is driven to rotate the stepping motor 162 in a forward direction or a reverse direction, and when the moving stage 164 is detected at the position of the sensor, the driving of the motor driving section 35 is stopped or switched from the forward rotation to the reverse rotation.

For example, during a process for returning the moving stage 164 to the start position, the driving of the motor driving section 35 is stopped if the moving stage 164 is detected by the sensor at the start position. Further, during a process of the reading cycle or the writing cycle, the driving of the motor driving section 35 is switched from the forward rotation to the reverse rotation (or from the reverse rotation to the forward rotation) when the moving stage 164 is detected by the sensor at the turn-around point.

The moving stage 164 can acquire the tag information from the RFID tag T through the RFID antenna 15 by rotating the threaded shaft 160 for one round trip, as long as the electric wave environment is good enough, thus, it may be set to stop the moving stage 164 if the threaded shaft 160 is started from a general fixed start position and rotated for one round trip and returned to the start position. In this case, the driving of the motor driving section 35 is stopped forcedly without waiting until the termination of the control of the reading cycle (or the writing cycle).

The communication control section 304 controls the communication I/F 34 to transmit various kinds of information between the self-checkout apparatus 1 and the reading apparatus 10. For example, the communication control section 304 receives the instruction information instructing the reading start sent from the self-checkout apparatus 1. The communication control section 304 sends the commodity code read by the reader/writer control section 302 from the RFID tag T to the self-checkout apparatus 1. The communication control section 304 receives the instruction information instructing the reading termination sent from the self-checkout apparatus 1. The communication control section 304 further receives the instruction information instructing the registration completion sent from the self-checkout apparatus 1.

Next, the operations of the self-checkout apparatus 1 and the reading apparatus 10 are described.

Figure 7:
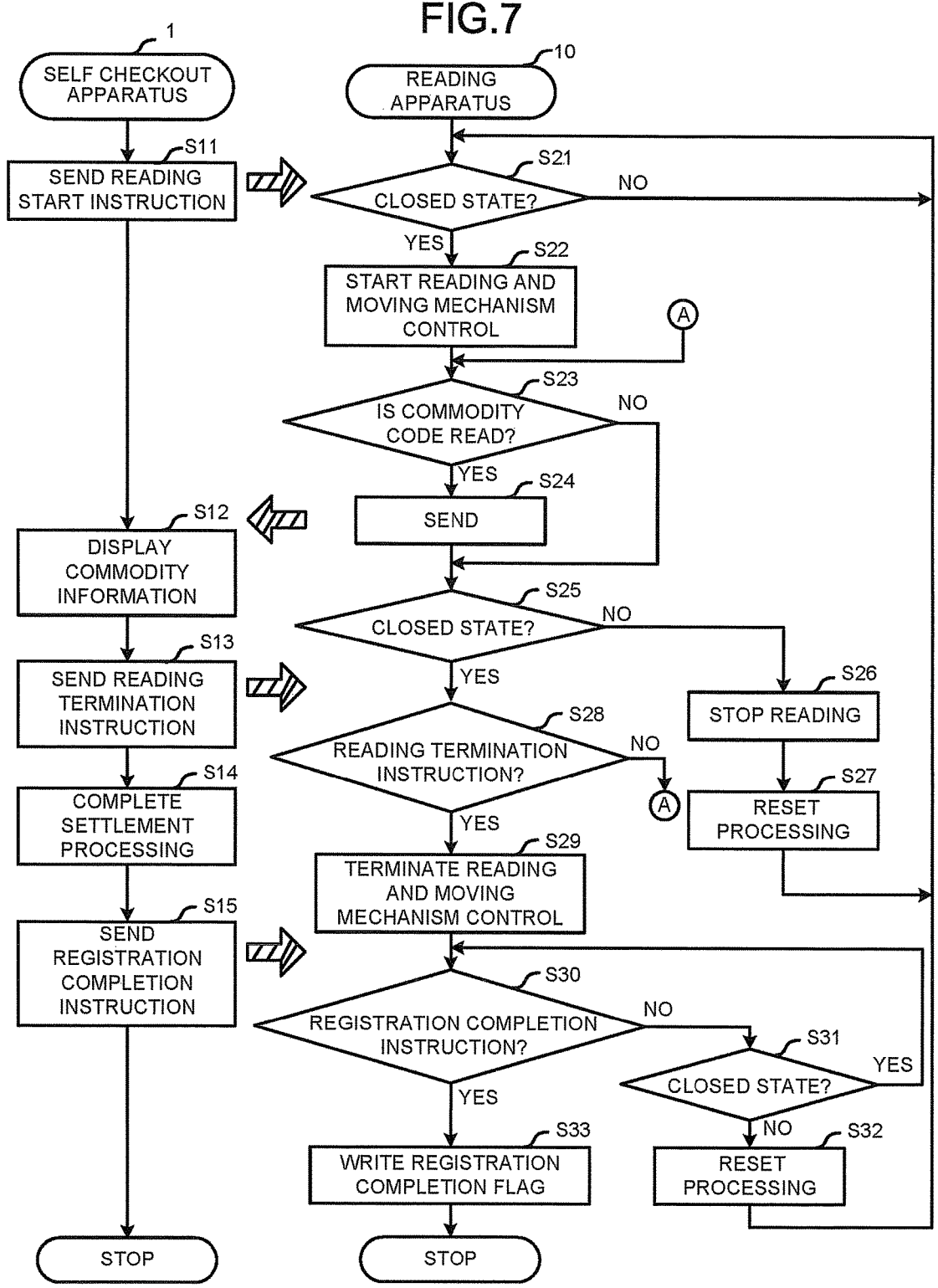
FIG. 7 is a flowchart illustrating an example of the operations of the self-checkout apparatus and the reading apparatus.

FIG. 7 is a flowchart illustrating an example of the operations of the self-checkout apparatus 1 and the reading apparatus 10.

The customer who operates the self-checkout apparatus 1 opens the opening and closing lid 12 of the reading apparatus 10 to put the shopping basket in which the commodities are housed in the reading room 13. Next, the customer operates the reading start button displayed on the display 3b of the self-checkout apparatus 1 to start the reading processing.

In the self-checkout apparatus 1, if the input reception section 202 receives the operation of the reading start button, the communication control section 203 controls to send the instruction information instructing the reading start to the reading apparatus 10 (ACT S11).

In the reading apparatus 10, if the communication control section 304 receives the instruction information instructing the reading start, the reader/writer control section 302 determines whether or not the opening and closing lid 12 is in the closed state based on the opened/closed state information acquired by the opened/closed state acquisition section 301 (ACT S21). If it is determined that the opening and closing lid 12 is in the opened state, the reader/writer control section 302 waits until the opening and closing lid 12 is turned into the closed state (NO in ACT S21). During the waiting period in ACT S21, the reader/writer control section 302 may cooperate with the display control section 201 of the self-checkout apparatus 1 to display a screen for instructing the user to close the opening and closing lid 12.

In ACT S21, if it is determined that the opening and closing lid 12 is in the closed state (YES in ACT S21), the reader/writer control section 302 controls to start the reading of the RFID tag T through the cooperation with the moving mechanism control section 303 (ACT S22). Specifically, the reader/writer control section 302 controls the reader/writer 31 to start the communication (reading cycle) with the RFID tag T, and notifies the moving mechanism control section 303 that the reading cycle is started. The moving mechanism control section 303 starts the driving of the motor driving section 35 according to the notification. That is, the motion of the moving stage 164 is started.

Next, the reader/writer 31 determines whether or not the commodity code is read from the RFID tag T (ACT S23). If the commodity code is read (YES in ACT S23), the communication control section 304 sends the read commodity codes to the self-checkout apparatus 1 in sequence (ACT S24), and then the processing in ACT S25 is carried out.

Next, in ACT S25, the reader/writer control section 302 determines whether or not the opening and closing lid 12 is in the closed state based on the opened/closed state information acquired by the opened/closed state acquisition section 301 (ACT S25). If it is determined in ACT S25 that the opening and closing lid 12 is in the closed state (YES in ACT S25), the reader/writer control section 302 determines whether or not the reading termination instruction is received from the self-checkout apparatus 1 (ACT S28). Herein, if the reading termination instruction is not received (NO in ACT S28), the processing in ACT S23 is carried out again.

In ACT S23, if the commodity code is not read yet (NO in ACT S23), the processing in ACT S25 is carried out.

If it is determined in ACT S25 that the opening and closing lid 12 is in the opened state (NO in ACT S25), the reader/writer control section 302 terminates the reading of the RFID tag T (ACT S26). Specifically, the reader/writer control section 302 controls the reader/writer 31 to stop the communication with the RFID tag T, and notifies the moving mechanism control section 303 that the reading cycle is stopped. The moving mechanism control section 303 stops the driving of the motor driving section 35 according to the notification. That is, the moving stage 164 is stopped.

Then the reader/writer control section 302 carries out a reset processing to reset the commodity codes that have been read until now (ACT S27), and then the processing in ACT S21 is carried out again.

For example, in a case in which the reading of the RFID tag T is started while the reading room 13 is in an empty state, the loop (YES in ACT S23~ACT S25, and NO in ACT S28) processing is carried out while no RFID tag T is read. Thus, to avoid such a state, the reading of the RFID tag T and the control of the moving mechanism may be terminated forcedly if a pre-determined time (for example, five seconds) elapses while no RFID tag T is read. Further, the reading of the RFID tag T and the control of the moving mechanism may also be terminated forcedly if the foregoing loop (YES in ACT S23~ACT S25, and NO in ACT S28) processing is executed for a pre-determined number of times. In this case, the reader/writer control section 302 cooperates with the display control section 201 of the self-checkout apparatus 1 to display a message indicating that no RFID tag T can be read.

In the self-checkout apparatus 1, if the communication control section 203 receives the commodity code from the reading apparatus 10, the display control section 201 reads the commodity information corresponding to the commodity code from the commodity master file and displays the commodity information on the display 3b (ACT S12).

The customer, after confirming that all the commodities in the shopping basket are displayed with reference to the commodity information displayed on the display 3b, operates the reading termination button displayed on the display 3b. Sequentially, if the input reception section 202 receives the operation on the reading termination button, the communication control section 203 sends the instruction information instructing the reading termination to the reading apparatus 10 (ACT S13).

In the reading apparatus 10, if the communication control section 304 receives the instruction information instructing the reading termination, the reader/writer control section 302 determines that the reading termination instruction is received (YES in ACT S28). Next, the reader/writer control section 302 terminates the reading of the RFID tag T (ACT S29). Specifically, the reader/writer control section 302 controls the reader/writer 31 to stop the communication with the RFID tag T, and notifies the moving mechanism control section 303 that the reading cycle is stopped. The moving mechanism control section 303 stops the driving of the motor driving section 35 according to the notification. That is, the moving stage 164 is stopped.

Sequentially, the reader/writer control section 302 determines whether or not the registration completion instruction is received from the self-checkout apparatus 1 (ACT S30). If the registration completion instruction is not received (NO in ACT S30), the reader/writer control section 302 determines whether or not the opening and closing lid 12 is in the closed state based on the opened/closed state information acquired by the opened/closed state acquisition section 301 (ACT S31).

If it is determined that the opening and closing lid 12 is in the closed state (YES in ACT S31), the processing in ACT S30 is carried out again. If it is determined that the opening and closing lid 12 is in the opened state (NO in ACT S31), the reader/writer control section 302 carries out the same reset processing as in ACT S27 (ACT S32), and then the processing in ACT S21 is re-executed.

In the self-checkout apparatus 1, if the settlement processing for each commodity displayed as a registration candidate is completed (ACT S14), the sales registration section 204 sales-registers each of these commodities. Then the communication control section 203 sends the instruction information instructing the registration completion to the reading apparatus 10 (ACT S15), and then the processing is terminated.

In the reading apparatus 10, if the communication control section 304 receives the instruction information instructing the registration completion, the reader/writer control section 302 determines that the registration completion instruction is received (YES in ACT S30). The reader/writer control section 302 controls the reader/writer 31 to write the registration completion flag in the RFID tag T of each commodity (ACT S33), and then the present processing is terminated.

Specifically, in ACT S33, the reader/writer control section 302 controls the reader/writer 31 to start the communication (writing cycle) with the RFID tag T, and notifies the moving mechanism control section 303 that the writing cycle is started. The moving mechanism control section 303 starts the driving of the motor driving section 35 according to the notification. After the registration completion flag is written in all the RFID tags T, the reader/writer control section 302 controls the reader/writer 31 to stop the communication (writing cycle) with the RFID tag T, and notifies the moving mechanism control section 303 that the writing cycle is stopped. The moving mechanism control section 303 stops the driving of the motor driving section 35 according to the notification.

During the processing of writing the registration completion flag, the reader/writer control section 302 may cooperate with the display control section 201 of the self-checkout apparatus 1 to display a screen to notify the user of keeping the opening and closing lid 12 closed. After the processing of writing the registration completion flag is completed, the reader/writer control section 302 may cooperate with the display control section 201 of the self-checkout apparatus 1 to display a screen to instruct the user to open the opening and closing lid 12.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the reading of the RFID tag T and the moving mechanism control of the RFID antenna are started in response to an operation instruction from the customer; however, the present invention is not limited to this. For example, the reading of the RFID tag T and the moving mechanism control of the RFID antenna may be automatically started by interlocking with the closing operation of the opening and closing lid 12, without the operation instruction from the customer.

In the embodiment described above, if the opening and closing lid 12 is turned into the opened state during a period from the moment the reading of the RFID tag T is started to the moment the registration completion flag is written, the reading is terminated and the reset processing is executed; however, the present invention is not limited to this. For example, a locking mechanism for keeping the opening and closing lid 12 closed may be arranged at the position where the housing 11 and the opening and closing lid 12 of the reading apparatus 10 are contacted with each other, in this way, a control can be carried out so that the opening and closing lid 12 cannot be opened. Specifically, during a period from the moment the reading of the RFID tag T is started to the moment the registration completion flag is written, the reader/writer control section 302 controls the locking mechanism so that the opening and closing lid 12 is kept in the closed state in which it cannot be opened. In this way, it can be prevented that a new commodity of which the RFID tag T is not read yet is put in the shopping basket (reading room 13) before the settlement processing is completed, It is exemplified in the embodiment described above that the reading of the RFID tag T is terminated in response to a termination instruction from the customer; however, the present invention is not limited to this. For example, the reading of the RFID tag T may be automatically terminated if a certain number (a number instructed by the customer and indicating the commodity quantity) of RFID tags are read.

In the embodiment described above, an electric wave method is adopted in the communication with the RFID tag; however, it is not limited to this. Other electromagnetic induction method may also be applied.

It is exemplified in the embodiment described above that one RFID antenna is arranged in the reading apparatus; however, two RFID antennas may be arranged in the reading apparatus. In this case, it is applicable to arrange both of the RFID antennas on the moving stage; it is also applicable to arrange one RFID antenna on the moving stage to be used as a moving RFID antenna, and arrange the other one at the housing of the reading apparatus be used as a fixed RFID antenna. Further, the number of the RFID antennas is not limited to two, and more RFID antennas may be arranged in the reading apparatus.

It is exemplified in the embodiment described above that the moving mechanism is arranged below the shopping basket C; however, it is not limited to this. The moving mechanism may be arranged at the lateral side, the back side and the upper side of the shopping basket C. It is preferred in any case that the reading surface of the RFID antenna is directed to the shopping basket C.

In the embodiment described above, the moving mechanism and the moving mechanism control section constitute the moving section of the RFID antenna. The moving mechanism for moving the RFID antenna in one direction is just described as one form of the moving mechanism that moves the RFID antenna. Thus, other forms may be adopted as the moving mechanism that moves the RFID antenna.

For example, a moving mechanism for moving the RFID antenna in two directions, a moving mechanism for moving the RFID antenna in three directions, or a moving mechanism for tilting the RFID antenna can be considered.

The ball screw mechanism is exemplified as the moving mechanism in the embodiment described above. However, it is not limited to this. For example, air pressure or magnet may be used in the motion.

Hereinafter, as a modification 1, the self-checkout apparatus arranges a moving RFID antenna (moving antenna section) and a fixed RFID antenna (fixed antenna section) in the reading apparatus. Further, the description of the same components as those of the self-checkout apparatus (including the reading apparatus) according to the embodiment described above is the same and is therefore not repeated.

(Modification 1)

Figure 8:
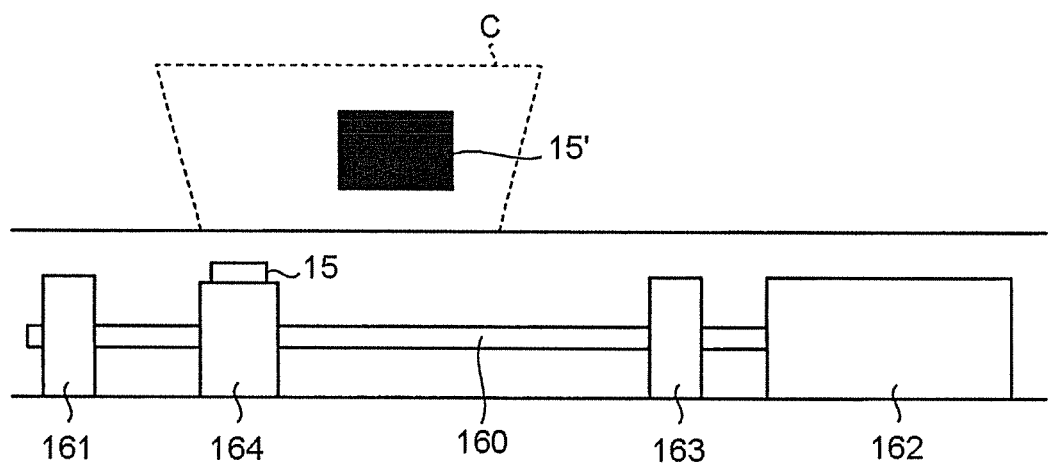
FIG. 8 is a side view illustrating a moving mechanism of a reading apparatus according to a modification 1.

FIG. 8 is a side view illustrating a moving mechanism of a reading apparatus 80 according to the modification 1. A moving RFID antenna 15 arranged on the moving mechanism below the placing table of the reading apparatus 80 according to the modification 1 and a fixed RFID antenna consumer terminal 15' arranged at the lateral side of the reading apparatus 80 are shown in FIG. 8.

Figure 9:
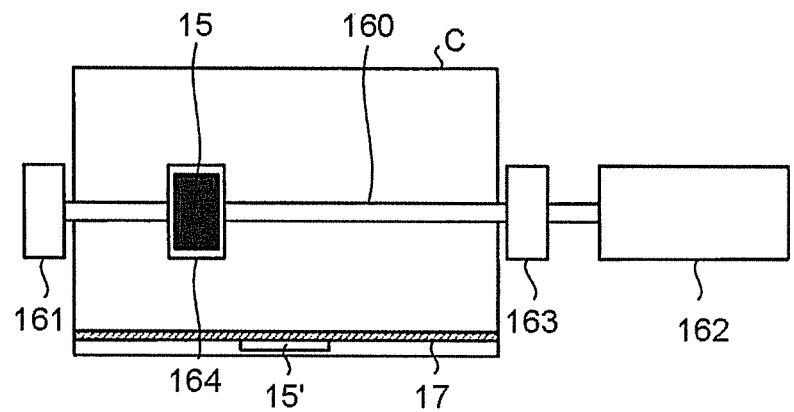
FIG. 9 is a plan view illustrating the moving mechanism.

FIG. 9 is a plan view illustrating the moving mechanism shown in FIG. 8.

Compared with the constitution shown in FIG. 3 and FIG. 4, the constitution shown in FIG. 9 and FIG. 8 further includes the fixed RFID antenna 15' arranged at the lateral side in the reading room 13.

In the present example, the fixed RFID antenna 15' is structurally identical to the moving RFID antenna 15.

The fixed RFID antenna 15' is fixed on a plate 17 (glass plate or wood plate through which the electric wave can easily pass) arranged in the reading room 13, with the reading surface thereof directed to the shopping basket C.

In the example shown in FIG. 8, the fixed RFID antenna 15' is located at the substantial center portion of the shopping basket C (indicated by dotted line) in the longitudinal direction.

With such a constitution, the reading and writing of the RFID tag information of the commodities in the shopping basket C can be carried out by the fixed RFID antenna 15' and the moving RFID antenna 15.

Figure 10:
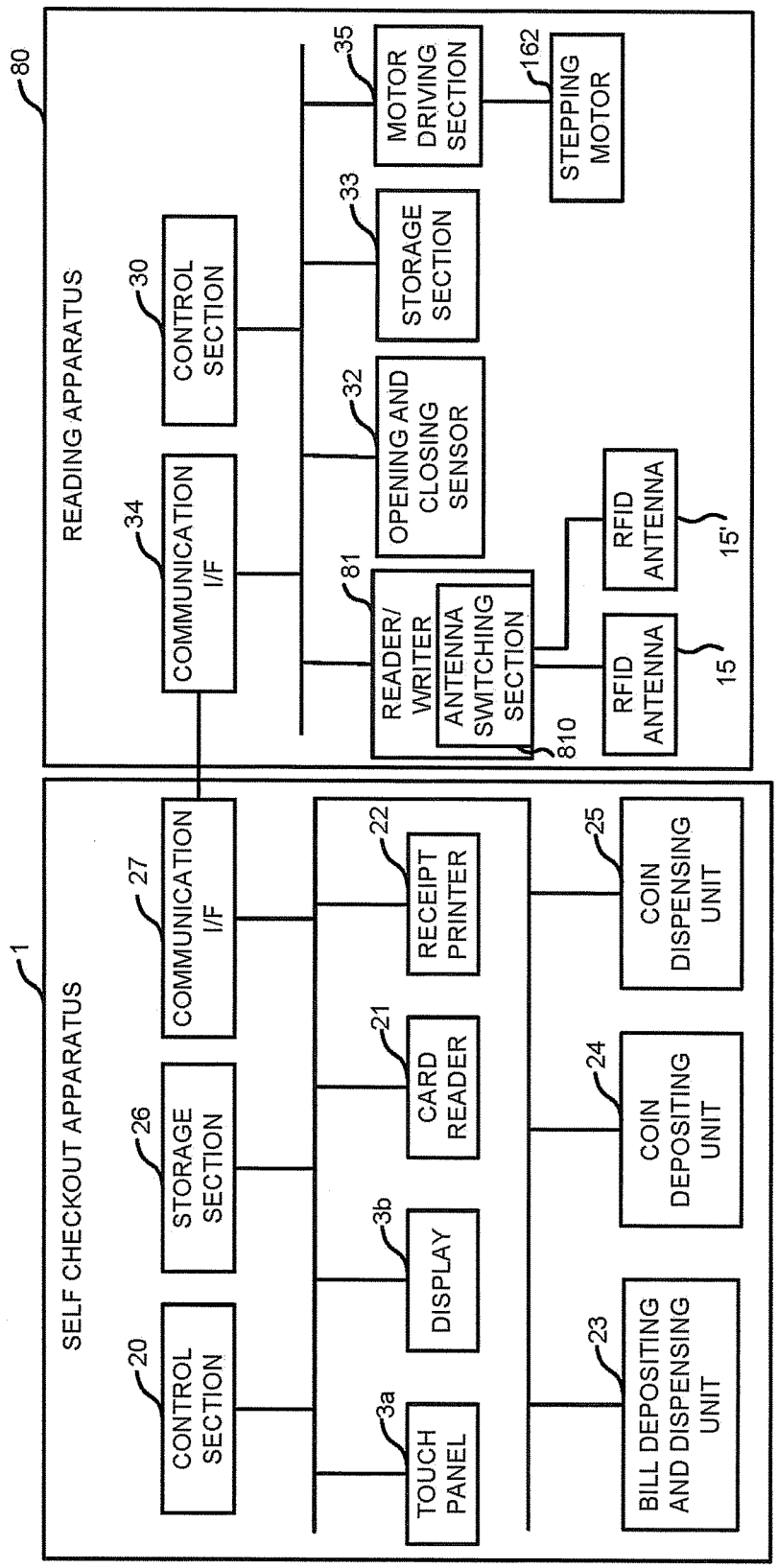
FIG. 10 is a block diagram illustrating the hardware constitution of the self-checkout apparatus and the reading apparatus.

FIG. 10 is a block diagram illustrating the hardware constitution of the self-checkout apparatus 1 and the reading apparatus 80 according to the modification 1.

The constitution of the self-checkout apparatus 1 in the modification 1 is the same as that described in the foregoing embodiment (refer to FIG. 5), and thus, the description thereof is omitted.

On the other hand, the reading apparatus 80 is different from the reading apparatus 10 (refer to FIG. 5 in the foregoing embodiment) in the constitution of a reader/writer 81.

The reader/writer 81 operates the two RFID antennas 15 and 15' under the instruction from the control section 30 to communicate with the RFID tag T to carry out data transmission.

Specifically, the reader/writer 81 is equipped with an antenna switching section (switch control section) 810 which alternatively selects one RFID antenna from the RFID antennas 15 and 15' connected with the reader/writer 81 to switch. The antenna switching section 810 alternatively selects and switches between the two RFID antennas 15 and 15' in a pre-determined order during the reading operation and the writing operation. Thus, the two RFID antennas 15 and 15' communicate with the RFID tag to carry out data transmission at different timing.

The communication with the RFID tag is consistently carried out until the end of one cycle (the reading cycle or the writing cycle) by the RFID antenna 15 (or the RFID antenna 15') switched by the antenna switching section 810.

Figure 11:
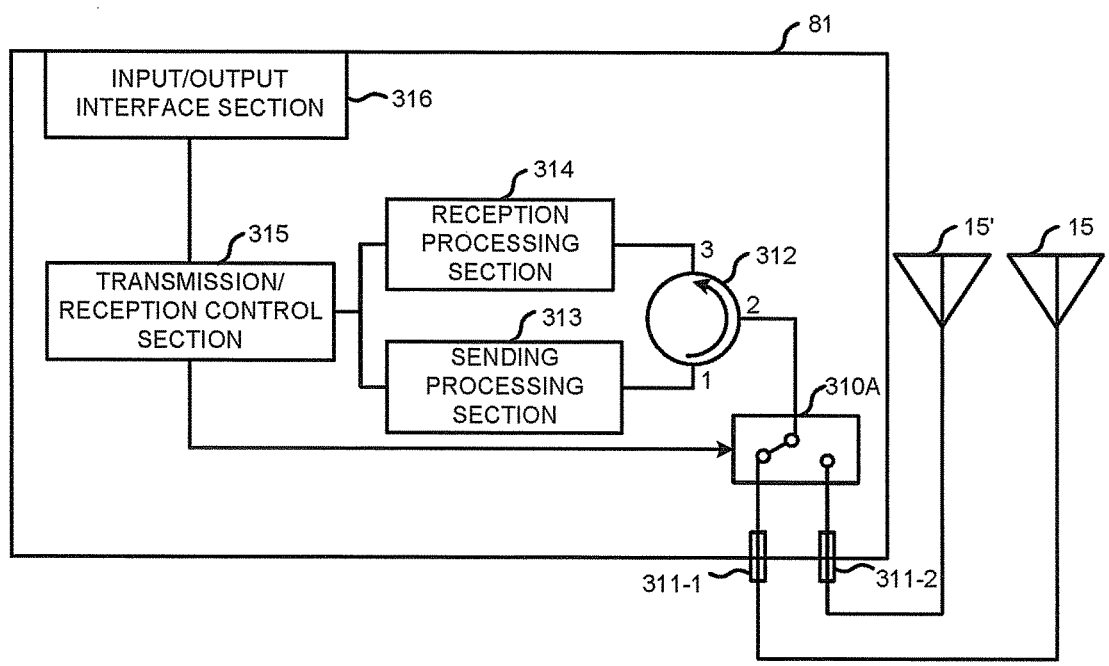
FIG. 11 is a diagram illustrating the constitution of a reader/writer.

FIG. 11 is a diagram illustrating an example of the constitution of the reader/writer 81.

As shown in FIG. 11, the reader/writer 81 includes two ports 311-1 and 311-2, a switch 310A as the antenna switching section 810, a circulator 312, a sending processing section 313, a reception processing section 314, a transmission/reception control section 315 and an input/output interface section 316.

In a case in which the RFID antennas 15 and 15' are arranged as external device of the reader/writer device, the two ports 311-1 and 311-2 connect each of the RFID antennas 15 and 15'.

The RFID antenna 15 and the RFID antenna 15' are respectively connected with the port 311-1 and the port 311-2 through coaxial cables.

The switch 310A may be, for example, a high-frequency switch constituted by a mechanical switch, or an electronic switch such as a diode switch and FET switch.

The switch 310A alternatively selects from the RFID antenna 15 and the RFID antenna 15' and switches to either transmission path. The transmission/reception control section 315 outputs, based on a signal indicating the reading start or writing start input from the control section 30 through the input/output interface section 316, a switch signal to the switch 310A in a pre-determined order, and alternatively selects one transmission path from the transmission path of the port 311-1 connected with the RFID antenna 15 and the transmission path of the port 311-2 connected with the RFID antenna 15'. FIG. 11 shows a state in which the transmission path of the port 311-1 connected with the RFID antenna 15 is selected. In this case, the RFID antenna 15 operates.

The transmission/reception control section 315 controls the sending processing section 313 and the reception processing section 314 according to a reading start command and reading termination command, or a writing start command and writing termination command received from the control section 30 through the input/output interface section 316. For example, pre-determined data is sent to the sending processing section 313, and the command or data and the like sent from the reception processing section 314 is sent to the control section 30 through the input/output interface section 316.

The transmission/reception control section 315 controls the switching operation of the switch 310A according to a switch command received from the control section 30 through the input/output interface section 316. The switching is carried out in a pre-determined order. For example, the switch 310A is turned on/off in the pre-determined order (such as first the port 311-1 and then the port 311-2) to switch the transmission path.

The sending processing section 313 mainly carries out the modulation processing. For example, the sending processing section 313 generates the non-modulated carrier wave, or modulates the carrier wave with the data sent from the transmission/reception control section 315. Then the sending processing section 313 amplifies the carrier wave and sends the carrier wave to the RFID antennas 15 and 15' through the circulator 312.

The reception processing section 314 mainly carries out the demodulation processing. For example, the reception processing section 314 amplifies the signal received by the RFID antennas 15 and 15' and transmitted through the circulator 312, and separates the data (tag information and the like) from the carrier wave. Then the reception processing section 314 sends the data acquired from the carrier wave to the transmission/reception control section 315.

The input/output interface section 316 carries out the input/output of the data or signal between the transmission/reception control section 315 and the control section 30.

In such a constitution, if there is an RFID tag reading command from the control section 30, the switch 310A is controlled through the transmission/reception control section 315 to alternatively select one transmission path from the transmission path of the port 311-1 and the transmission path of the port 311-2. The transmission path is switched in the pre-determined order. For example, if there is a reading command, it is switched to the transmission path of the port 311-1 first. Then the non-modulated carrier wave is amplified in the sending processing section 313 and sent to the circulator 312. The signal is sent to the RFID antenna 15 through the coaxial cable and the port 311-1 connected in the switch 310A as the transmission path, and then emitted as the electric wave (interrogation wave). If there is a response to the interrogation wave from the RFID tag, the response wave is received by the RFID antenna 15, and then the signal is received by the reception processing section 314 via the switch 310A and the circulator 312; the reception processing section 314 amplifies the signal to acquire tag information from the signal, and then sends the acquired tag information to the transmission/reception control section 315; then the transmission/reception control section 315 sends the generated tag information to the control section 30 through the input/output interface section 316.

If there is an RFID antenna switch command from the control section 30, the switch 310A is controlled through the transmission/reception control section 315 to switch to the transmission path of the port 311-2 this time. Then, similarly, the non-modulated carrier wave is amplified in the sending processing section 313 and sent to the circulator 312. The signal is sent to the RFID antenna 15' through the coaxial cable and the port 311-2 connected in the switch 310A as the transmission path, and then emitted as the electric wave. If there is a response to the interrogation wave from the RFID tag, the response wave is received by the RFID antenna 15', and then the signal is received by the reception processing section 314 via the switch 310A and the circulator 312; the reception processing section 314 amplifies the signal to acquire tag information from the signal, and then sends the acquired tag information to the transmission/reception control section 315; then the transmission/reception control section 315 sends the generated tag information to the control section 30 through the input/output interface section 316.

Further, if there is an RFID tag writing command from the control section 30, the processing is carried out according to the same procedure.

That is, if there is an RFID tag writing command from the control section 30, it is switched to the transmission path of the port 311-1 first. Then the carrier wave is modulated by the sending processing section 313 according to the data or writing command, and the modulated carrier wave is amplified and sent to the circulator 312. The signal is sent to the RFID antenna 15 through the coaxial cable and the port 311-1 connected in the switch 310A as the transmission path, and then emitted as the electric wave.

If there is a response indicating that the writing is ended to the electric wave from the RFID tag, the response wave is received by the RFID antenna 15, and then the signal is received by the reception processing section 314 via the switch 310A and the circulator 312; the reception processing section 314 amplifies the signal to acquire tag information from the signal, and then sends the acquired tag information to the transmission/reception control section 315; then the transmission/reception control section 315 sends the generated tag information to the control section 30 through the input/output interface section 316.

Sequentially, if there is an RFID antenna switch command from the control section 30, the switch 310A is controlled through the transmission/reception control section 315 to switch to the transmission path of the port 311-2 this time. Then the writing processing by the operation of the RFID antenna 15' is carried out similarly.

Further, if the writing command is received in the RFID tag, the data (the registration completion flag in the present example) is written in a pre-determined storage area of an inner memory, and then the result is replied to the RFID antenna.

In the constitution of the reader/writer control section 302 (refer to FIG. 6) shown in one functional constitution of the reading apparatus 10, necessary functions are added to the reading apparatus 80 according to the modification 1.

The reader/writer control section 302 controls the reader/writer 81 to read the RFID tag attached to the commodity and write data in the RFID tag through a plurality of RFID antennas.

Specifically, if the reading-start instruction is sent from the self-checkout apparatus 1 and the opened/closed state information acquired by the opened/closed state acquisition section 301 indicates that the opening and closing lid 12 is in the closed state, the reader/writer control section 302 controls to start the reading (reading cycle) first.

The reading cycle is carried out by the reader/writer control section 302 which controls the antenna switching section 810 to switch between the two RFID antennas 15 and 15' in the pre-determined order.

For example, the reader/writer control section 302 first selects the RFID antenna 15 through the antenna switching section 810. Then the reading operation is carried out in this state to read the tag information of the RFID tag T within the response range from the RFID antenna 15. After a certain time elapses from the reading start, it is switched from the RFID antenna 15 to the RFID antenna 15' by the antenna switching section 810 this time. Then the reading operation is carried out similarly in this state to read the tag information of the RFID tag T within the response range from the RFID antenna 15'.

For example, in a case of carrying out reading by the fixed RFID antenna, the certain time until the switch of the antenna is so set that the recognition of the tag information is not carried out for the certain time; in a case of carrying out reading by the moving RFID antenna, the certain time until the switch of the antenna is so set that the moving stage moves for a round trip on the threaded shaft.

Further, the tag information (the commodity code in the present example) read from the RFID tag T is sent from the reader/writer control section 302 to the self-checkout apparatus 1 at any time.

The reader/writer control section 302, if receiving a reading termination instruction from the self-checkout apparatus 1, terminates the reading operation carried out by the reader/writer 81. Then the reader/writer control section 302, if receiving a registration completion instruction from the self-checkout apparatus 1, controls the reader/writer 81 to start the writing (writing cycle) of the registration completion flag. Herein, the registration completion flag indicates that the sales registration is completed and is written in a pre-determined storage area of the RFID tag T.

The writing cycle of the reader/writer control section 302 is carried out in the same way as the reading cycle, that is, the reader/writer control section 302 controls the antenna switching section 810 to switch between the two RFID antennas 15 and 15' in the pre-determined order. For example, the reader/writer control section 302 switches to the RFID antenna 15 first. Then the writing operation of the registration completion flag is carried out in this state to send a writing command to the RFID tag T within the response range from the RFID antenna 15, and then the writing result is received. After all the writing results are received, it is switched to the RFID antenna 15' this time. Then the writing operation is carried out similarly in this state to send a writing command to the RFID tag T within the response range from the RFID antenna 15', and then the writing result is received.

Next, the operations of the self-checkout apparatus 1 and the reading apparatus 80 are described.

Figure 12:
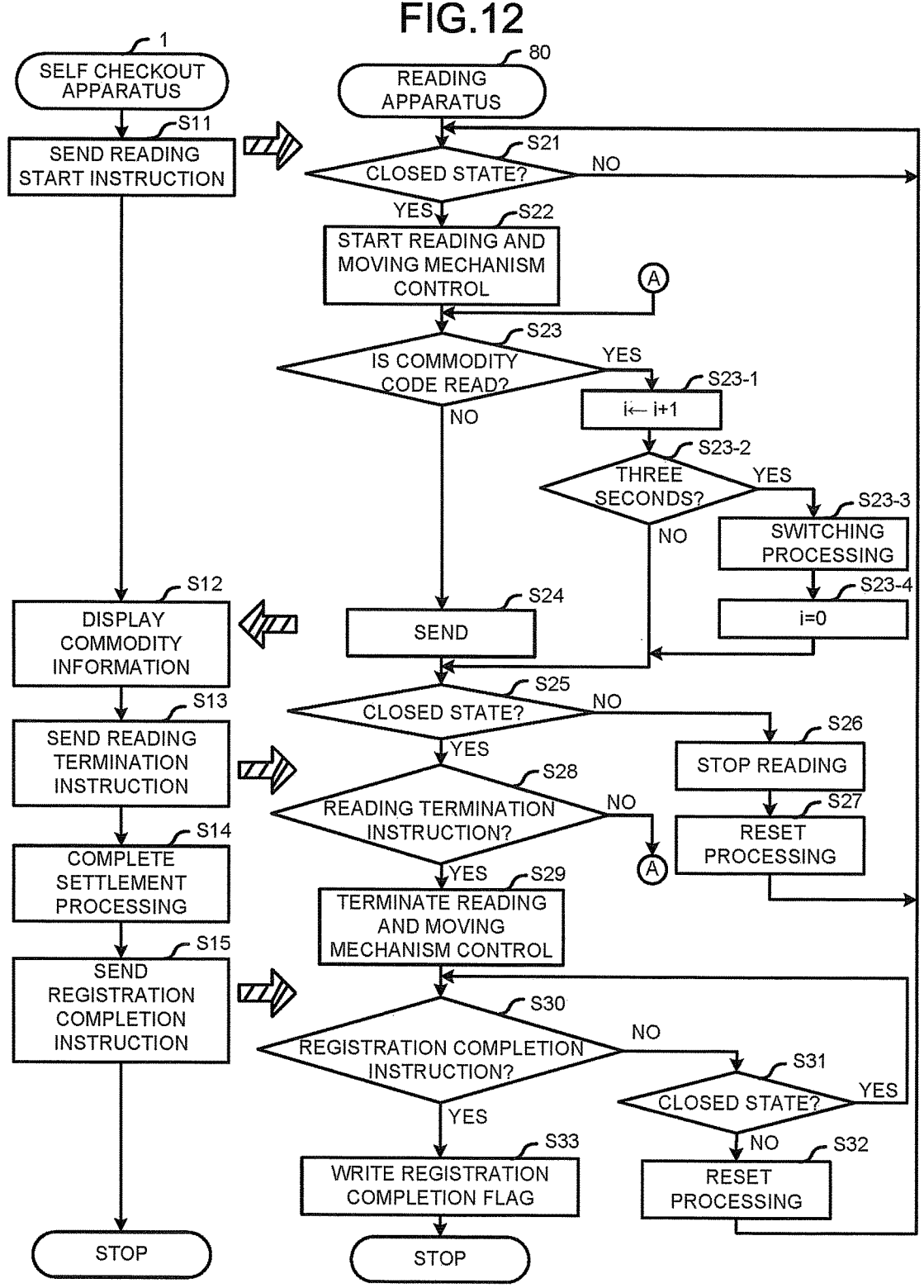
FIG. 12 is a flowchart illustrating an example of the operations of the self-checkout apparatus and the reading apparatus.

FIG. 12 is a flowchart illustrating an example of the operations of the self-checkout apparatus 1 and the reading apparatus 80. Herein, the processing in ACT S22~ACT S25, ACT S28 and ACT S33 in the operation flow shown in FIG. 7 is described.

In ACT S22, the reader/writer control section 302 controls to start the reading of the RFID tag through the cooperation with the moving mechanism control section 303.

Specifically, the reader/writer control section 302 controls the reader/writer 81 to start the communication (reading cycle) with the RFID tag, and notifies the moving mechanism control section 303 that the reading cycle is started. The moving mechanism control section 303 starts the driving of the motor driving section 35 according to the notification. That is, the motion of the moving stage 164 is started.

The communication with the RFID tag is carried out by the RFID antenna (the RFID antenna 15 or the RFID antenna 15') to which the transmission path is fixed. Herein, in the initializing processing carried out when the reading apparatus 80 is started, it is fixed to the transmission path of the RFID antenna 15, thus, the reading is carried out by the RFID antenna 15 in this stage.

Next, the reader/writer control section 302 determines whether or not the commodity code is read from the RFID tag (ACT S23). If the commodity code is read (YES in ACT S23), the communication control section 304 sends the read commodity codes to the self-checkout apparatus 1 in sequence (ACT S24), and then the processing in ACT S25 is carried out.

Next, in ACT S25, the reader/writer control section 302 determines whether or not the opening and closing lid 12 is in the closed state based on the opened/closed state information acquired by the opened/closed state acquisition section 301 (ACT S25). If it is determined in ACT S25 that the opening and closing lid 12 is in the closed state (YES in ACT S25), the reader/writer control section 302 determines whether or not the reading termination instruction is received from the self-checkout apparatus 1 (ACT S28). Herein, if the reading termination instruction is not received (NO in ACT S28), the processing in ACT S23 is carried out again.

In ACT S23, if the commodity code is not read yet (NO in ACT S23), the processing in ACT S23-1 is carried out.

In ACT S23-1, the value of a parameter i for counting the time is incremented. A value "0" is set as the parameter i in the initializing processing carried out when the reading apparatus 80 is started, and the value "0" is already set as the parameter i when the present processing is started.

Then it is determined whether or not the parameter i is greater than a value indicating a pre-determined time (ACT S23-2). The value indicating a pre-determined time is properly determined according to the timing of sending from the reading apparatus, the response speed from the RFID tag, or the time until the moving stage moves for one cycle. In the present example, the value indicating a pre-determined time is set to three seconds.

If it is determined in ACT S23-2 that the parameter i is not greater than three seconds (NO in ACT S23-2), the processing in ACT S25 is carried out.

If it is determined in ACT S23-2 that the parameter i is greater than three seconds (YES in ACT S23-2), the RFID antenna switching processing is executed (ACT S23-3). Specifically, the RFID antenna switching processing is carried out as follows. The control section 30 of the reading apparatus 80 switches the RFID antenna 15 (or the RFID antenna 15') selected by the antenna switching section 810 to the RFID antenna 15' (or the RFID antenna 15).

Sequentially, the value of the parameter i is initialized to "0" (ACT S23-4), and then the processing in ACT S25 is carried out.

Next, the processing in ACT S33 is described.

In ACT S33, the reader/writer control section 302 controls the reader/writer 81 to write the registration completion flag in the RFID tag of each commodity.

Specifically, first the RFID antenna 15 is selected to write the registration completion flag in the RFID tag from the RFID antenna 15; sequentially, it is switched to the RFID antenna 15' this time to write the registration completion flag in the RFID tag from the RFID antenna 15'. Then, the writing result is received from all the RFID tags.

In the constitution described above, generally, the motor driving section 35 operates and the moving stage 164 moves continuously during the communication with the RFID tag. Thus, the moving stage 164 moves continuously even after it is switched from the moving RFID antenna 15 to the fixed RFID antenna 15'. When it is switched to the fixed RFID antenna, the electric wave environment in the reading room cannot be changed. Thus, there may be a case in which the communication with the RFID tag cannot be carried out due to the placement and the direction of the RFID tag. However, if the moving stage 164 moves continuously during the reading period of the fixed RFID antenna 15', the electric wave environment in the reading room can be changed at any time because, for example, the electric wave reflection state in the moving stage 164 is changed. In this way, it is possible to communicate with the RFID tag which cannot communicate with the fixed RFID antenna 15'.

In the modification 1, the RFID antenna 15 is arranged on the moving stage 164; however, it is not limited to this. It is also applicable that only the RFID antenna 15' is arranged without the RFID antenna 15, and the communication with the RFID tag is carried out without any switching. Even in this case, the electric wave environment in the reading room can be changed because the moving stage 164 moves continuously during the reading period of the fixed RFID antenna 15', and therefore, the ability to read the RFID tag can be improved.

Next, as a modification 2, the self-checkout apparatus arranges a mechanism which moves the RFID antenna in two directions in the reading apparatus. Further, the description of the same components as those of the self-checkout apparatus (including the reading apparatus) according to the foregoing embodiment and the modification 1 is the same and is therefore not repeated.

(Modification 2)

Figure 13:
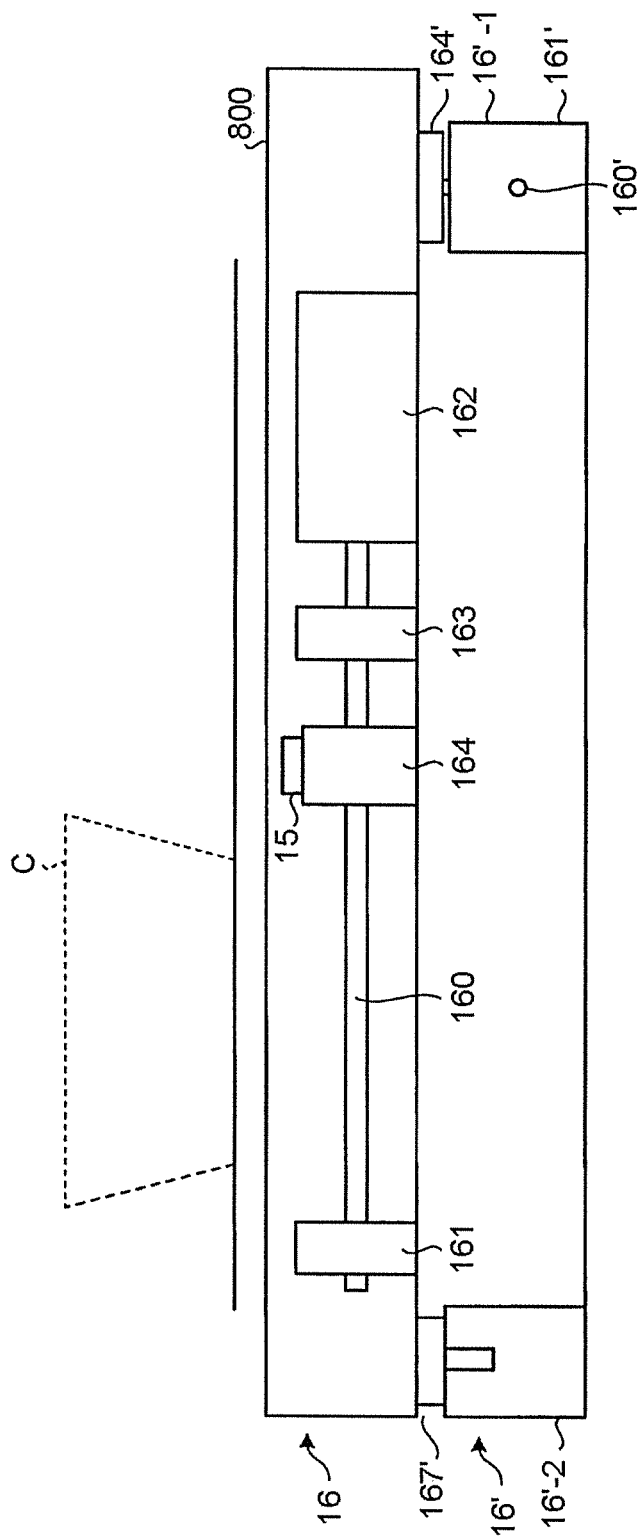
FIG. 13 is a side view illustrating a moving mechanism of a reading apparatus according to a modification 2.

FIG. 13 is a side view illustrating a moving mechanism of a reading apparatus 90 according to the modification 2.

Figure 14:
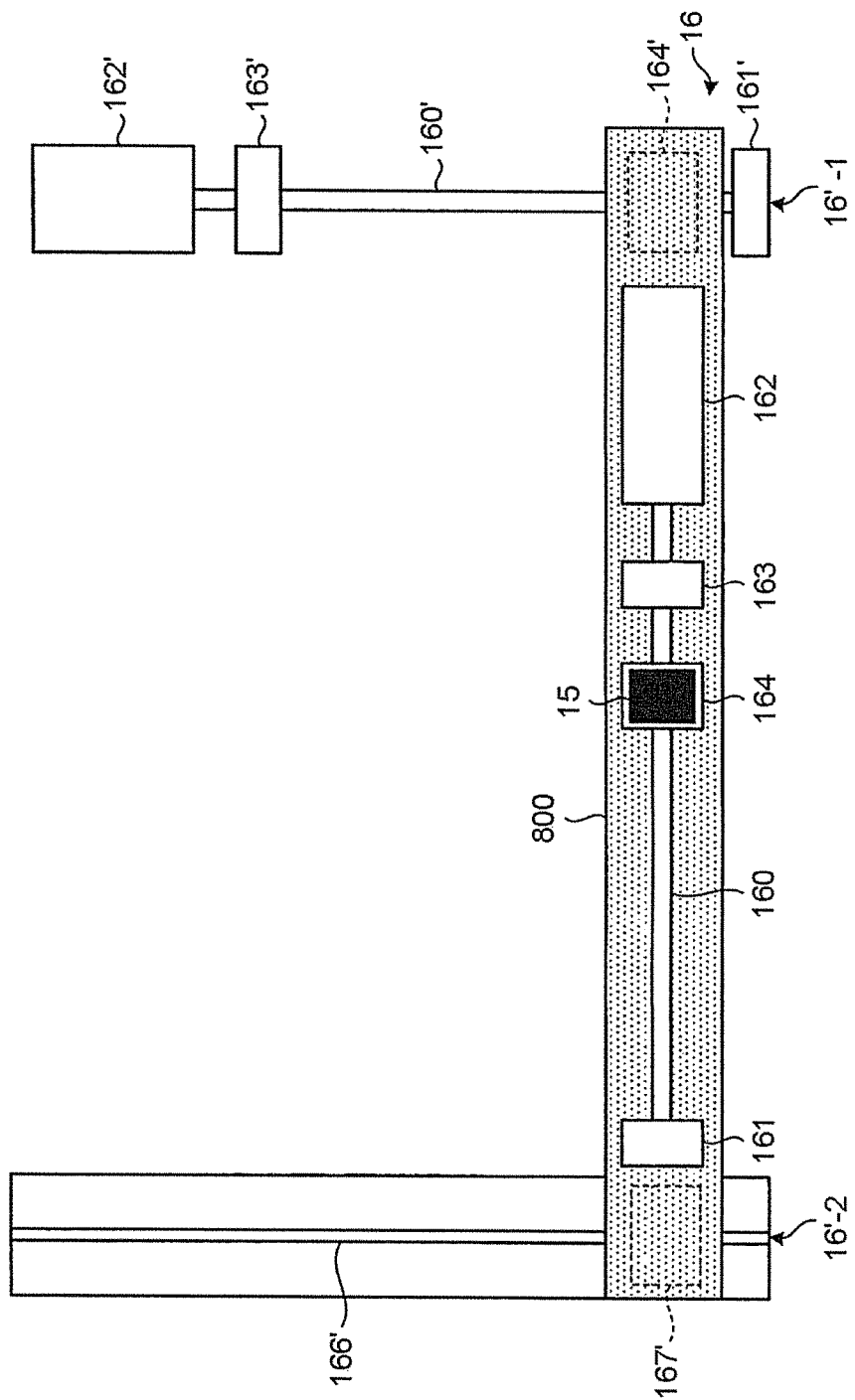
FIG. 14 is a plan view illustrating the moving mechanism.

FIG. 14 is a plan view illustrating the moving mechanism shown in FIG. 13.

In the constitution shown in FIG. 13 and FIG. 14, a new moving mechanism which moves the RFID antenna in a direction (Y-axis) vertical to the horizontal plane is further arranged in addition to the moving mechanism shown in FIG. 3 and FIG. 4 which moves the RFID antenna in uniaxial (X-axis) direction.

A moving mechanism for X-axis 16 shown in modification 2 is housed in a rectangular case 800 above a moving mechanism for Y-axis 16' and is capable of moving horizontally in the Y-axis direction. The bearing 161, the coupling 163, the stepping motor 162 and the like housed in the case 800 are horizontally supported by the bottom of the case 800.

The moving mechanism for Y-axis 16' includes a ball screw mechanism section 16'-1 and a guide rail 16'-2. The ball screw mechanism section 16'-1 is structurally identical to the moving mechanism for X-axis 16. That is, the ball screw mechanism section 16'-1 is mainly constituted by a linear moving mechanism including a threaded shaft 160', a bearing 161' of the threaded shaft 160', a stepping motor 162' serving as a rotation power source, a coupling 163' for transmitting rotation power to the threaded shaft 160', and a moving stage (second moving section) 164' constituted integrally with a ball screw nut which is screwed onto the threaded shaft 160'.

The guide rail 16'-2 is arranged parallel to the threaded shaft 160' at a distance from the ball screw mechanism section 16'-1. The distance between the ball screw mechanism section 16'-1 and the guide rail 16'-2 is set to be substantially equal to the length of the moving mechanism for X-axis 16.

The guide rail 16'-2 and the ball screw mechanism section 16'-1 support the two ends of the moving mechanism for X-axis 16. The height of the main body of the guide rail 16'-2 is set to such a height that the moving mechanism for X-axis 16 can be supported horizontally, and the length thereof is set to such a length that the moving distance of the moving stage 164' of the ball screw mechanism section 16'-1 is not restricted. Further, a groove 166' having a certain width is arranged in the length direction on the main body of the guide rail 16'-2. A convex member 167' which is in sliding pair with the groove 166' and the upper surface of the groove 166' fits the convex portion thereof into the groove and fixes the upper surface thereof on one end of the bottom of the moving mechanism for X-axis 16.

The upper surface of the moving stage 164' arranged on the ball screw mechanism section 16'-1 is fixed on the other end of the bottom of the moving mechanism for X-axis 16.

With such a constitution, the moving mechanism for X-axis 16 is supported by the ball screw mechanism section 16'-1 and the guide rail 16'-2 at each end, and is horizontally supported above the moving mechanism for Y-axis 16'.

According to the later-described control, if the moving stage 164' of the moving mechanism for Y-axis 16' moves, the moving mechanism for X-axis 16, which is integrated with the moving stage 164', also moves horizontally in the Y-axis direction while keeping the posture thereof. At this time, the convex member 167' slides in the groove 166' of the guide rail 16'-2 along the groove. Further, if the moving stage 164 of the moving mechanism for X-axis 16 moves, the RFID antenna 15 arranged on the moving stage 164 moves in an X-Y plane with the reading surface thereof directed upwards.

Next, the modification 2 is described in detail. Further, in order to improve the positioning accuracy of the moving stage 164, sensors may be arranged on the moving path of each of the moving stage 164 and the moving stage 164' to carry out position correction.

Sequentially, the hardware constitution of the self-checkout apparatus 1 and the reading apparatus 90 is described. Herein, the hardware constitution of the self-checkout apparatus 1 and part of the constitution of the reading apparatus 90 are the same as those shown in FIG. 5, thus, the two stepping motors in the hardware constitution of the reading apparatus 90 are described in detail.

Figure 15:
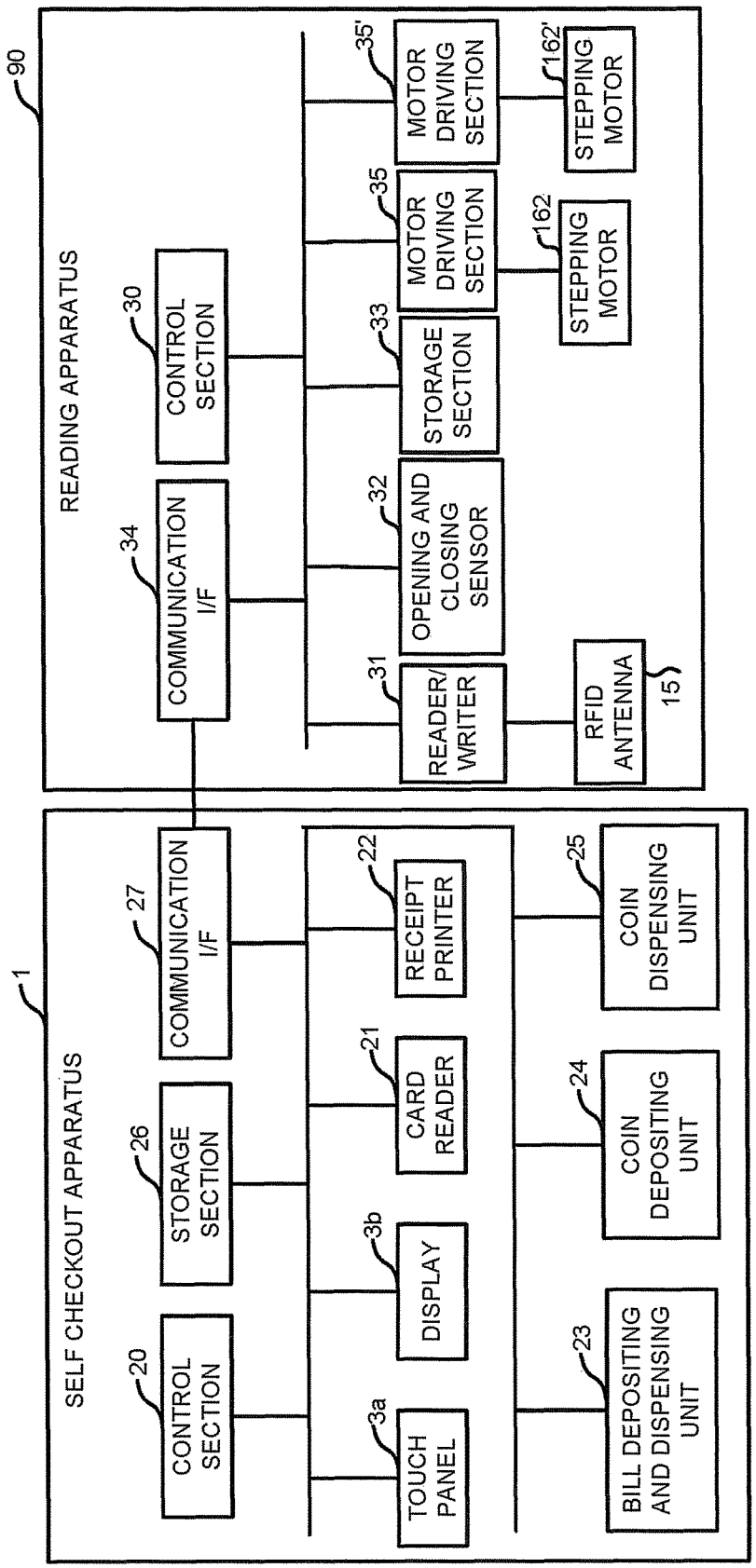
FIG. 15 is a block diagram illustrating the hardware constitution of the self-checkout apparatus and the reading apparatus.

FIG. 15 is a block diagram illustrating the hardware constitution of the self-checkout apparatus 1 and the reading apparatus 90.

As shown in FIG. 15, the reading apparatus 90 according to the modification 2 includes two stepping motors 162 and 162'.

The stepping motor 162 is used to move the moving stage for X-axis 164, and the stepping motor 162' is used to move the moving stage for Y-axis 164'.

The motor driving sections 35 and 35' drive the stepping motors 162 and 162' respectively. The motor driving sections 35 and 35' output pulse signals for rotating the stepping motors 162 and 162' by a pre-determined angle (step angle) to the stepping motors 162 and 162' under the control of the control section 30.

Specifically, if the motor driving section 35 outputs the pulse signal to the stepping motor 162, the stepping motor 162 is rotated by the pre-determined angle, and in this way, the moving stage for X-axis 164 moves in the X-axis direction.

Further, if the motor driving section 35' outputs the pulse signal to the stepping motor 162', the stepping motor 162' is rotated by the pre-determined angle, and in this way, the moving stage for Y-axis 164' moves in the Y-axis direction.

It is assumed that the controls on the motor driving section 35 and the motor driving section 35' by the control section 30 may be carried out independently.

Next, the functional components of the self-checkout apparatus 1 and the reading apparatus 90 are described. Herein, the function of the moving mechanism control section 303 in FIG. 6 is additionally described.

The moving mechanism control section of the reading apparatus 90 controls the motor driving section 35 and the motor driving section 35' during the RFID tag reading processing.

Specifically, the moving mechanism control section drives the motor driving section 35 and the motor driving section 35' in a pre-determined pattern during the reading cycle (or the writing cycle) of the RFID tag by the reader/writer control section 302. In this way, the moving stage 164 of the RFID antenna 15 moves in the X-Y plane by interlocking with the driving of each of the stepping motors 162 and 162'.

The pattern for driving the motor driving sections 35 and 35', that is, the moving pattern of the RFID antenna 15 includes the following.

Pattern 1: moving, in the X-Y plane, from a base point to the end in the X-axis direction first and then to the end in the Y-axis direction.

Pattern 2: moving in the X-axis direction along the central axis of the shopping basket C in the longitudinal direction and then in the Y-axis direction along the central axis of the shopping basket C in the lateral direction.

Pattern 3 (repeating pattern): moving from a base point to the end in the X-axis direction first and then moving in the Y-axis direction for a pre-determined distance; sequentially, moving reversely along the X-axis till the other end in the X-axis direction; then moving in the Y-axis direction for a pre-determined distance again, and then moving to the end in the forward direction of the X-axis. This procedure is repeated in a range in which the movement in the Y-axis direction is possible.

Pattern 4: moving in the X-Y plan in a circular orbit.

There are various other moving patterns for the user to select properly.

Figure 16:
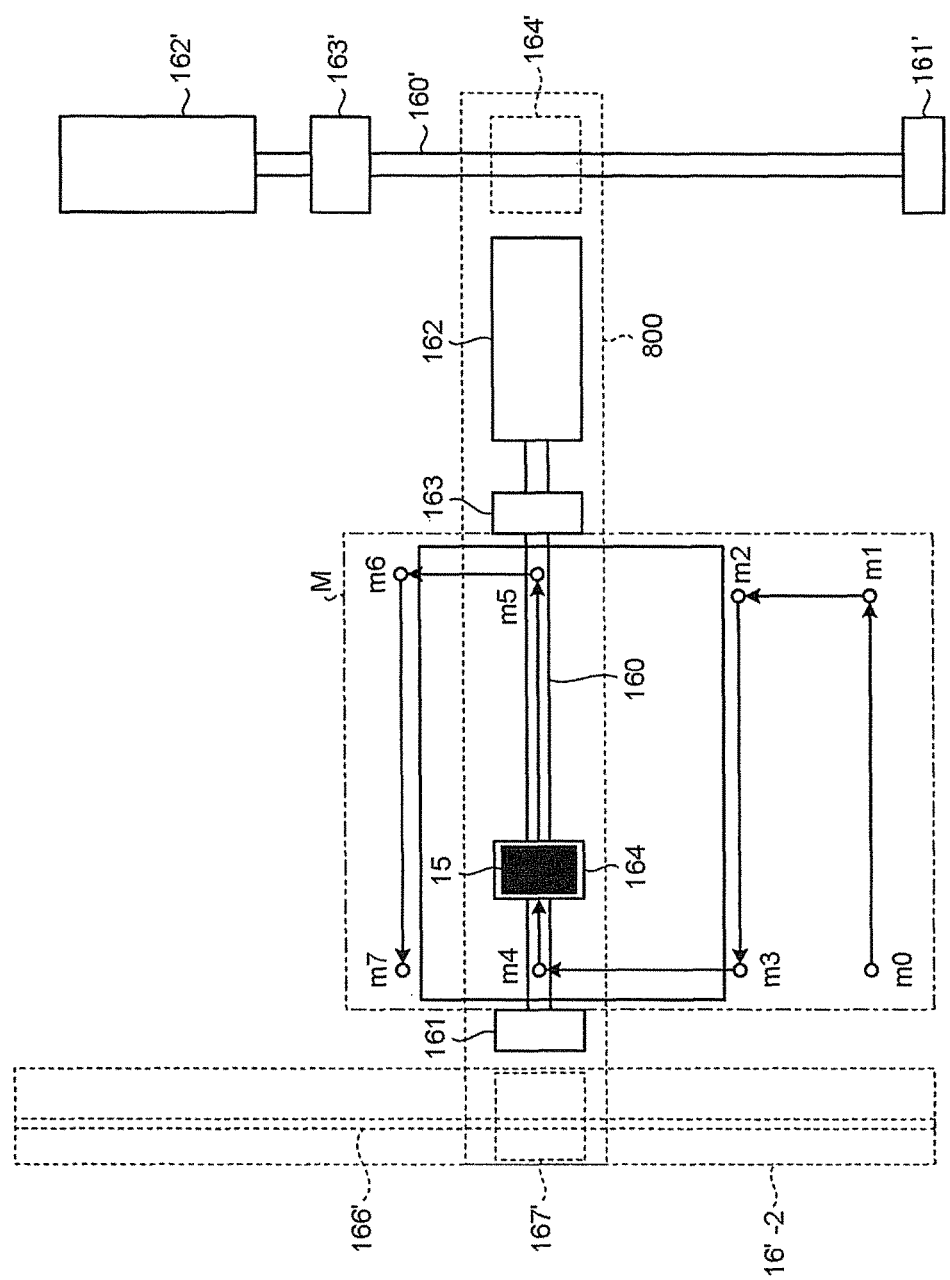
FIG. 16 is a diagram illustrating a moving pattern.

FIG. 16 is a diagram illustrating one repeating pattern in the moving patterns described above.

FIG. 16 is a plan view illustrating the moving mechanisms 16 and 16'. The reference mark M surrounded by two-dot chain line indicates the range in which the RFID antenna 15 can move in the X-Y plane.

In the repeating pattern, first, the RFID antenna 15 is started to be moved from the base point m0. In this case, the moving stage for Y-axis 164' is moved as far as possible towards the bearing 161' and the moving stage for X-axis 164 is moved as far as possible towards the bearing 161 so as to move the RFID antenna 15 to the base point.

Next, the RFID antenna 15 is moved from m0 to m1. This motion is carried out by moving the moving stage for X-axis 164 while stopping the moving stage for Y-axis 164'.

Then the RFID antenna 15 is moved from m1 to m2. This motion is carried out by moving the moving stage for Y-axis 164' for a pre-determined distance while stopping the moving stage for X-axis 164. In the present example, the moving stage for Y-axis 164' is moved in the Y-axis direction for the pre-determined distance three times in one cycle of reading/writing, thus, the moving distance is set to a length obtained by dividing the distance of the moving range M of the RFID antenna 15 in the Y-axis direction into three equal parts.

Next, the RFID antenna 15 is moved from m2 to m3. This motion is carried out by reversing the moving stage for X-axis 164 while stopping the moving stage for Y-axis 164'.

Then, the motion from m3 to m4, from m4 to m5, from m5 to m6 and from m6 to m7 is the same as the motion described above, and therefore the detailed description thereof is not provided repeatedly.

FIG. 16 shows a state in which the RFID antenna 15 is being moved from m4 to m5.

As stated above, the RFID antenna 15, if moved in the repeating pattern described above, can be moved in the moving range M without omission.

Such a motion may be carried out continuously, or intermittently by stopping the RFID antenna 15 every a certain distance Similar to the embodiment described above, the moving speed of the moving stage 164 is maintained at a speed slower than a speed at which the RFID antenna 15 can communicate with the RFID tag.

Further, in order to start the moving stage 164 generally from the pre-determined start position m0, it is controlled to drive the motor driving section for Y-axis 35' to return the moving stage 164 to the initial position (reading/writing start position) after the control of the reading cycle (or the writing cycle) by the reader/writer control section 302 is completed. In this case, the control amount (number of pulses) is equal to the distance from m7 to m0 (equal to the maximum movement amount in the Y-axis direction in the moving range M).

In a case in which the sensor for positioning is arranged, the motor driving section 35' is driven to rotate the stepping motor 162' in the forward direction or the reverse direction, and is stopped when the moving stage 164 is detected at the position of the sensor.

Next, the operations of the self-checkout apparatus 1 and the reading apparatus 90 are described. In the processing shown in FIG. 7, the different processing in ACT S22 (the processing for starting the reading and the moving mechanism control) and ACT S33 (the processing for writing the registration completion flag) is described particularly.

In the reading apparatus 90 according to the modification 2, the processing for starting the reading and the moving mechanism control is carried out in the following way.

In the processing, the reader/writer control section 302 controls to start the reading of the RFID tag through the cooperation with the moving mechanism control section. Specifically, the reader/writer control section 302 controls the reader/writer 31 to start the communication (reading cycle) with the RFID tag, and notifies the moving mechanism control section that the reading cycle is started. The moving mechanism control section starts the driving of the motor driving section 35 and the motor driving section 35' in the pre-determined pattern according to the notification. For example, in a case in which the pattern is the repeating pattern shown in FIG. 16, the motor driving section 35 is driven from m0 to m1, and then the motor driving section 35' is driven from m1 to m2. The motor driving section 35 and the motor driving section 35' are driven alternately in the similar way from m2 to m7. The RFID antenna 15, if moved to m7, is returned to m0 again, and then the motor driving section 35 and the motor driving section 35' are driven alternately from m0.

It may also be set to stop the driving of the motor driving sections 35 and 35' after the RFID antenna 15 is moved for one cycle from m0 to m7.

For example, in a case in which the reading of the RFID tag is started while the reading room 13 is in an empty state, the loop (YES in ACT S23~ACT S25, and NO in ACT S28) processing is carried out while no RFID tag is read. Thus, to avoid such a state, it is exemplified in the embodiment described above that the reading of the RFID tag and the control of the moving mechanism may be terminated forcedly if five seconds elapse while no RFID tag is read. The same measure may be taken in the modification 2. In this case, the time is preferred to be longer than the time taken for moving the RFID antenna 15 for one cycle in the pre-determined pattern.

In ACT S29 in FIG. 7, the reader/writer control section 302 stops the reading of the RFID tag.

In the reading apparatus according to the modification 2, the reader/writer control section 302 also stops the reading of the RFID tag in the processing. Specifically, the reader/writer control section 302 controls the reader/writer 31 to stop the communication with the RFID tag, and notifies the moving mechanism control section that the reading cycle is stopped. The moving mechanism control section stops the driving of the motor driving section 35 and the motor driving section 35' according to the notification. That is, the moving stage 164 is stopped.

Next, the processing for writing the registration completion flag is described.

In the processing, the reader/writer control section 302 controls the reader/writer 31 to start the communication (writing cycle) with the RFID tag, and notifies the moving mechanism control section that the writing cycle is started. The moving mechanism control section starts the driving of the motor driving section 35 and the motor driving section 35' according to the notification. After the registration completion flag is written in all the RFID tags, the reader/writer control section 302 controls the reader/writer 31 to stop the communication (writing cycle) with the RFID tag, and notifies the moving mechanism control section that the writing cycle is stopped. The moving mechanism control section stops the driving of the motor driving section 35 and the motor driving section 35' according to the notification. The moving pattern of the RFID antenna 15 in the writing cycle is preferred to be the same as the moving pattern in the reading cycle.

Next, as a modification 3, the self-checkout apparatus arranges a mechanism which tilts the RFID antenna in the reading apparatus. Further, the description of the same components as those of the self-checkout apparatus (including the reading apparatus) according to the foregoing embodiment and the modification 1 is the same and is therefore not repeated in the modification 3.

(Modification 3)

Figure 17:
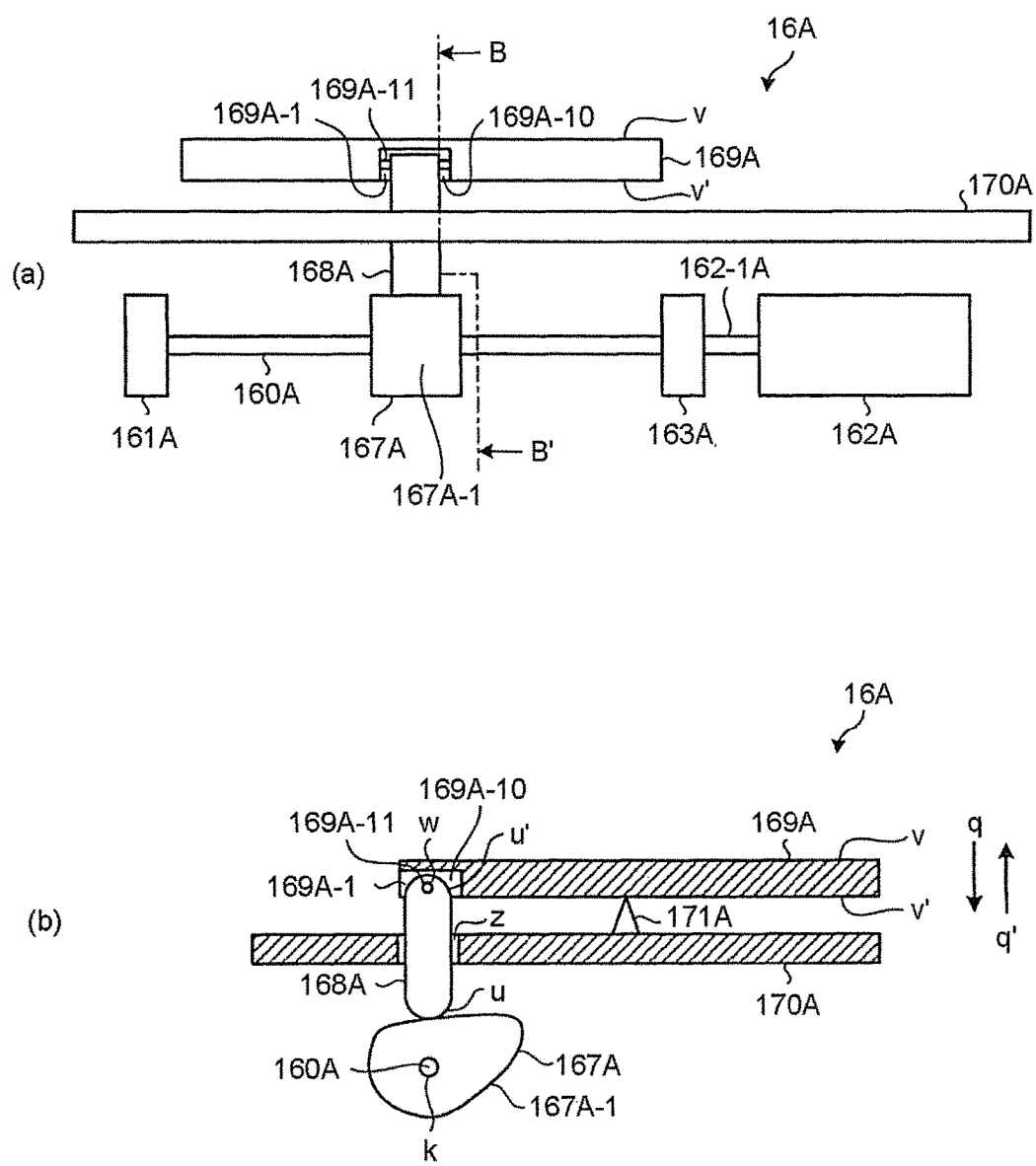
FIG. 17 is a diagram illustrating a moving mechanism of a reading apparatus according to a modification 3.

FIG. 17 is a diagram illustrating a moving mechanism of a reading apparatus according to the modification 3.

FIG. 17 (*a*) is a side view illustrating the moving mechanism.

FIG. 17 (*b*) is a cross-sectional view of the moving mechanism shown in FIG. 17 (*a*) taken in the direction of the arrows B-B along the dot and dashed line.

A moving mechanism 16A is constituted to be capable of changing the angle of the stage equipped with the RFID antenna.

The moving mechanism 16A is mainly constituted by a rotation mechanism including a rotation shaft 160A, a bearing 161A of the rotation shaft 160A, a stepping motor 162A serving as a rotation power source, a coupling 163A for transmitting rotation power to the rotation shaft 160A and a cam 167A fixed on the rotation shaft 160A, a transmission member 168A which reciprocates linearly while contacting with the cam 167A, and a stage 169A connected with the transmission member 168A.

The rotation shaft 160A is horizontally supported by the bearing 161A at one end and the coupling 163A at the other end to be capable of axially rotating freely. An output shaft 162-1A of the stepping motor 162A is connected with the other end of the rotation shaft 160A in the coupling 163A. With such a constitution, the rotation power of the stepping motor 162A is transmitted from the output shaft 162-1A to the rotation shaft 160A via the coupling 163A.

The cam 167A has a through-hole k having a diameter substantially equal to the diameter of the rotation shaft 160A at the center part thereof, and is fixed on the rotation shaft 160A by inserting the rotation shaft 160A through the through-hole k. The outer peripheral surface 167A-1 of the cam 167A is formed into a curved surface to which the distance from the rotation shaft 160A changes according to the position.

The shape of the transmission member 168A is a substantial rectangular shape of which two opposite end surfaces are formed into curved surfaces. An end surface u formed into a curved surface slides along the outer peripheral surface 167A-1 of the cam 167A as a sliding pair, and the other end surface u' formed into a curved surface avoids contact with a later-described opening 169A-10 of the stage 169A.

The stage 169A fixes the RFID antenna on an upper surface v thereof. The stage 169A includes a connection part 169A-1 at one end for connecting with the transmission member 168A. The connection part 169A-1 is used to assemble the transmission member 168A so that the transmission member 168A is capable of rotating freely with respect to the stage 169A. Herein, the opening 169A-10 is arranged at one end of the stage 169A, and a pin 169A-11 passing through opening 169A-10 is inserted through a through-hole w of the transmission member 168A, and in this way, the transmission member 168A is connected in a rotatable manner. The stage 169A is arranged across a support member 171A on a platform 170A.

The support member 171A is fixed on the platform 170A to support the bottom v' of the stage 169A at the center of gravity part.

The platform 170A has a through-hole z of which the shape is almost the same as the cross-section of the transmission member 168A, and is horizontally arranged above the rotation mechanism. The transmission member 168A connects the cam 167A with the stage 169A across the through-hole z of the platform 170A.

With such a constitution, the cam 167A rotates along with the rotation of the rotation shaft 160A, and the transmission member 168A receives input from the outer peripheral surface 167A-1 formed on the cam 167A, and in this way, the transmission member 168A reciprocates linearly in a vertical direction while the moving direction thereof is regulated in the vertical direction by the through-hole z of the platform 170A. If the transmission member 168A is pushed upwards by the outer peripheral surface 167A-1 of the cam 167A, the stage 169A is tilted in a direction indicated by arrow q shown in FIG. 17 (*b*) by taking the support member 171A as a fulcrum; if the transmission member 168A falls downwards due to the outer peripheral surface 167A-1 of the cam 167A, the stage 169A is tilted in a direction indicated by arrow q' shown in FIG. 17 (*b*) by taking the support member 171A as a fulcrum. Thus, if the cam 167A rotates continuously, the tilting direction of the stage 169A, that is, the direction of the RFID antenna is changed sequentially.

Further, the control circuit, functions and operations of the moving mechanism according to the modification 3 are the same as described in the embodiment stated above.

As stated above, the self-checkout apparatus according to the present embodiment and each modification is equipped with the RFID antenna and the moving section, and changes the range of communication with the RFID tag through the moving section. In this way, the RFID antenna can change the angle with the antenna surface of the RFID tag located at a position where it can hardly be read, which prevents the reading omission of the information of the RFID tag located at a position where it can hardly be read.

The directions and placement of the RFID tags of the commodities in the shopping basket are various. For example, in a case in which the clothing is mixed with other clothing, the directions of the RFID tags are different. If there is an RFID tag located at such an angle that the reading can hardly be carried out, the communication with the RFID tag cannot be carried out with one RFID antenna fixed at a certain position.

However, even in such a case, through the motion of the RFID antenna, the angle between the RFID antenna and the antenna surface of the RFID tag can be changed, and the electric wave environment can also be changed by changing the reflection direction of the electric wave, thus, the communication with the RFID tag located at a position where the communication can hardly be carried out at a fixed position can be carried out now.

Thus, the technology for collectively reading the information of the RFID tags of the commodities in the shopping basket without omission can be improved.

The programs executed in each apparatus of the present embodiment are installed in a storage medium (ROM or storage section) of each apparatus in advance; however, the present invention is not limited to this. The programs executed in each apparatus of the present embodiment may be recorded in a computer-readable recording medium such as CD-ROM, flexible disk (FD), CD-R, DVD (Digital Versatile Disk) and the like in the form of installable or executable file. Further, the storage medium, which is not limited to a medium independent from a computer or an incorporated system, further includes a storage medium for storing or temporarily storing the downloaded program transferred via an LAN or the Internet.

Further, the programs executed in each apparatus of the present embodiment may be stored in a computer connected with a network such as the Internet, and downloaded via the network. Further, the program executed in each apparatus of the present embodiment may also be provided or distributed via a network such as the Internet.

What is claimed is:

1. A self-checkout apparatus comprising:
   a casing including
   a storage room for housing a commodity attached with a wireless tag, and
   a placing table for placing the commodity with the wireless tag inside the storage room,
   a reading module configured to read information of the wireless tag from the commodity attached with the wireless tag and housed in the storage room, and
   a data processing module configured to carry out sales registration and checkout processing of the commodity of which the wireless tag information is read by the reading module; wherein
   the reading module includes,
   a moving antenna section for reading the information of the wireless tag from the commodity housed in the storage room, wherein the moving antenna section is arranged at a gap between the placing table and a bottom of the storage room, and
   a moving section for changing a communication range with the wireless tag by moving the moving antenna section in a direction parallel to a placing surface of the placing table intermittently, wherein the moving section moves the moving antenna section a pre-determined distance and stops the moving antenna section for a defined time.

2. The self-checkout apparatus according to claim 1, wherein
   the reading module includes a fixed antenna section of which the communication range with the wireless tag is fixed; and
   the moving section moves the moving antenna section intermittently when the fixed antenna section communicates with the wireless tag.

3. The self-checkout apparatus according to claim 1, wherein
   the moving section moves the moving antenna section in one direction to change the communication range with the wireless tag.

4. The self-checkout apparatus according to claim 1, wherein
   the moving section moves the moving antenna section in two directions to change the communication range with the wireless tag.

5. A self-checkout method including:
   reading information of a wireless tag from a commodity attached with the wireless tag and housed in a storage room while intermittently moving a moving antenna section in a direction parallel to a placing surface of a placing table to change communication range between the moving antenna section and the wireless tag, wherein
   the moving antenna section is arranged at a gap between the placing table and a bottom of the storage room,
   the placing table is a table for placing the commodity with the wireless tag inside the storage room, and
   the intermittently moving the moving antenna section comprises moving the moving antenna section a pre-determined distance and stopping the moving antenna section for a defined time; and
   carrying out sales registration and checkout processing of the commodity of which the wireless tag information is read.

6. The self-checkout method of claim 5, further comprising:
   after the defined time, moving the moving antenna section another pre-determined distance; and
   stopping the moving antenna section at the another pre-determined distance for another defined time.

7. The self-checkout method of claim 5, wherein the moving the moving antenna section is at a high speed.

8. The self-checkout method of claim 5, wherein the defined time is selected for completion of a communication with the wireless tag.

9. The self-checkout apparatus of claim 1, wherein the moving section, after the defined time, moves the moving antenna section another pre-determined distance and, after the moving antenna section is moved the pre-determined distance, the moving section stops the moving antenna section for another defined time.

10. The self-checkout apparatus of claim 1, wherein the moving section moves the moving antenna section at a high speed.

11. The self-checkout apparatus of claim 1, wherein the defined time is selected for completion of a communication with the wireless tag.

* * * * *